US006968995B1

(12) United States Patent  
Yamamoto et al.

(10) Patent No.: US 6,968,995 B1  
(45) Date of Patent: Nov. 29, 2005

(54) INTEGRATED CIRCUIT FOR PROTOCOL CONTROL

(75) Inventors: Koken Yamamoto, Kawasaki (JP); Shigeru Hashimoto, Kawasaki (JP); Ryoichi Yanagi, Kawasaki (JP); Yusuke Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/376,308

(22) Filed: Aug. 18, 1999

(30) Foreign Application Priority Data

Oct. 22, 1998 (JP) .......................................... 10-301498

(51) Int. Cl.$^7$ ............................................. G06F 17/60
(52) U.S. Cl. ...................................... 235/379; 705/35
(58) Field of Search ........................... 235/379; 705/35, 705/39, 41–43

(56) References Cited

U.S. PATENT DOCUMENTS

| 4,731,842 A | | 3/1988 | Smith |
| 5,361,364 A | | 11/1994 | Nagashige et al. |
| 5,577,121 A | | 11/1996 | Davis |
| 5,596,642 A | * | 1/1997 | Davis et al. ................... 705/68 |
| 5,608,894 A | | 3/1997 | Kawakami et al. |
| 6,000,607 A | * | 12/1999 | Ohki et al. .................. 235/379 |
| 6,182,900 B1 | | 2/2001 | Wiehler |
| 6,220,510 B1 | * | 4/2001 | Everett et al. .............. 235/380 |
| 6,250,557 B1 | * | 6/2001 | Forslund et al. ............ 235/492 |

FOREIGN PATENT DOCUMENTS

| DE | 44 06 602 A1 | 9/1995 |
| DE | 197 10 249 A | 9/1998 |
| EP | 0 807 907 A1 | 11/1997 |
| EP | 0 889 449 A1 | 1/1999 |
| JP | 5-11898 | 1/1993 |
| JP | 7-262025 | 10/1995 |
| JP | 9-128464 | 5/1997 |
| JP | 10-247187 | 9/1998 |
| WO | WO 97/02548 | 1/1997 |

OTHER PUBLICATIONS

"Notification of Reason(s) For Refusal" dated Jul. 7, 2003, English translation (5 pgs. 1–5).

"Control LSI For Electronic Money System", Proceedings of the 1997 Electronics Society Conference of IEICE, vol. 1997, Yutaka Takami, et al., Sep. 3–6, 1997, Waseda University, Tokyo, p. 106, English translation (3 pgs. 1–3).

"Digital Cash Technology, Chapter 17: Transaction Card From Citibank and Chapter 18, Smart Card" Peter Wayner, Softbank Books, Sep. 20, 1997, pp. 171–184, English Translation (27 pgs. 1–27).

(Continued)

*Primary Examiner*—Karl D. Frech  
(74) *Attorney, Agent, or Firm*—Armstrong, Kratz, Quintos, Hanson & Brooks, LLP

(57) ABSTRACT

A protocol control integrated circuit configured by integrating, on one chip, hardware and control programs necessary for conducting data interchange through communications with portable type mediums, and used in common among various types of apparatus. Thus, the integrated circuit is constructed by integrating, on one chip, a storage section for storing a control program prepared for protocols for a plurality of digital money different in mode from each other, a processing section for controlling the handling of the plurality of digital money, different in mode, by running the control program stored in the storage section, and an interface circuit connected to an external circuit including at least one of an external processing section and an external storage section for fulfilling an interface function between the external circuit and the processing section. Further this invention is applicable to various types of transaction apparatus capable of handling, for example, digital money and credit transactions.

36 Claims, 28 Drawing Sheets

OTHER PUBLICATIONS

"All About Digital Money", Chapter 6, IC Card, Nikkei Business Publications, Inc., Nikkei Digital Money System, Independent Volume, 1997, pp. 241–265, English Translation (33 pgs. 1–33).

"Multifunctional IC Card OS for EC and Reader/Writer Developed by IBM Japan"; *The Japan Industrial Journal*; No. 23, vol. 9, Sep. 10, 1997, p. 61.

Copy of Japanese Patent Office Decision of Rejection for corresponding Japanese Patent Application No. HEI–301498 dated Dec. 2, 2003.

Copy of Korean Patent Office Communication for corresponding Korean Patent Application No. 10–1999–0040885 dated Mar. 2, 2005.

"Handbuch der Chipkarte"; 1995, pp. 246–247.

* cited by examiner

```
#90    ROOT                              550
#01    IFD=#90   PORT=#1
#02    IFD=#01   PORT=#1
#03    IFD=#01   PORT=#2
#04    IFD=#02   PORT=#1
#05    IFD=#02   PORT=#2
```

```
[DEVICE DEFINITION]                      550
  #01   IFD=#01
  #02   IFD=#02    ICCRW01
  #03   IFD=#02    ICCRW02
  #20   IFD=#01    LCD
  #21   IFD=#01    KEY
```

F I G. 18
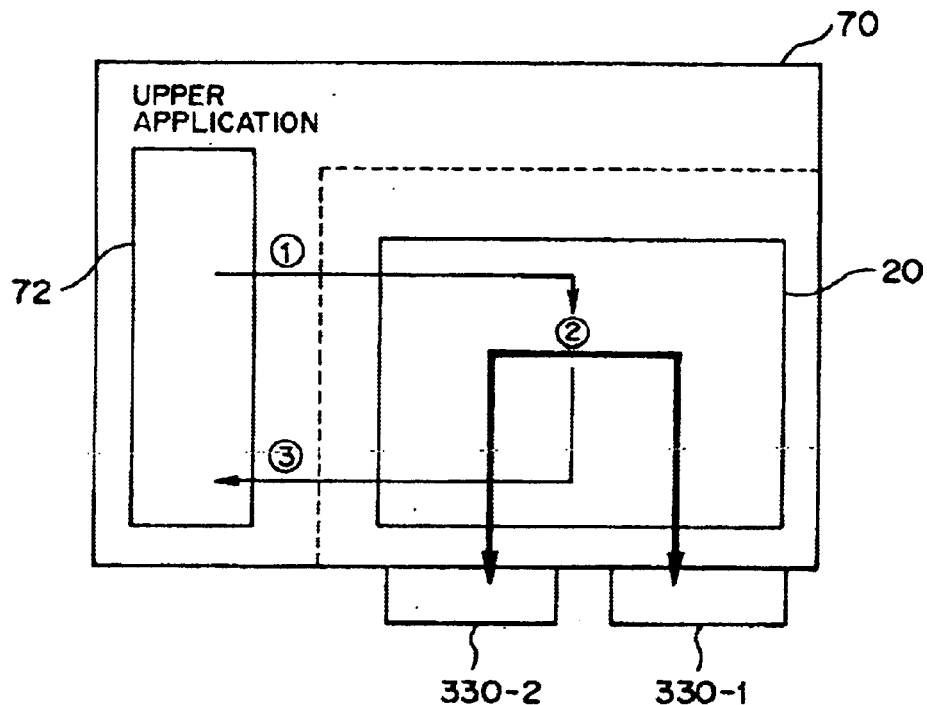
F I G. 19
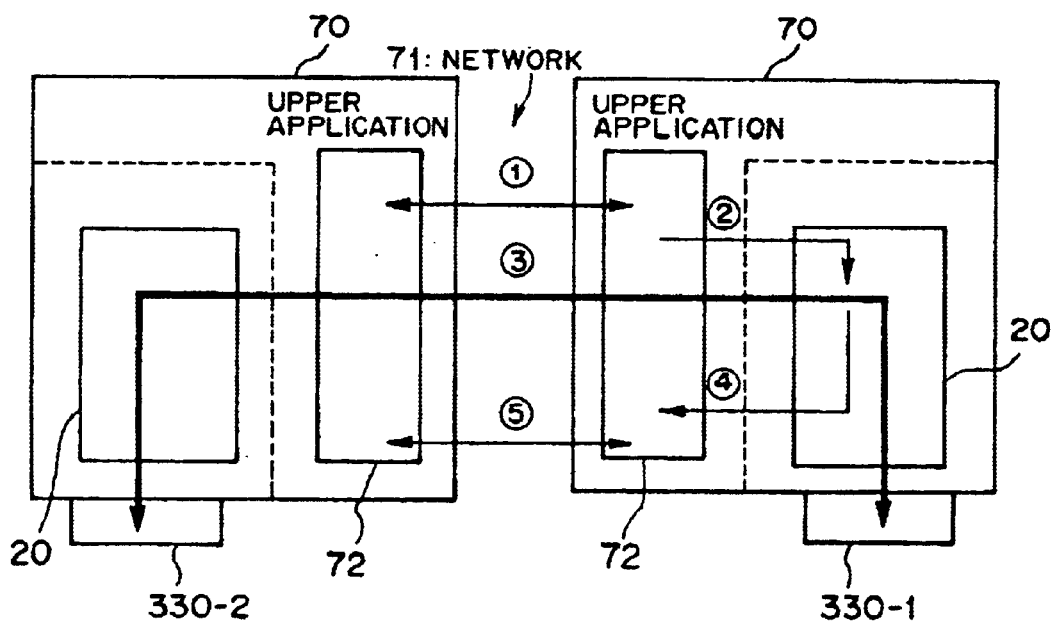

FIG.27

| Bit No. | NAME | UNIT NAME | VALUE OF Bit | |
|---|---|---|---|---|
| | | | 0 | 1 |
| 15 | UPSYS | UPPER UNIT | CONNECTION | NON-CONNECTION |
| 14 | LWSYS | LOWER UNIT | CONNECTION | NON-CONNECTION |
| 13 | EXROM | EXTERIOR TYPE ROM | CONNECTION | NON-CONNECTION |
| 12 | EXFLSH | EXTERIOR TYPE FLASH | CONNECTION | NON-CONNECTION |
| 11 | EXRAM | EXTERIOR RAM | CONNECTION | NON-CONNECTION |
| 10 | KB | KEYBOARD | CONNECTION | NON-CONNECTION |
| 9 | GB | GREEN BUTTON | CONNECTION | NON-CONNECTION |
| 8 | BZ | BUZZER | CONNECTION | NON-CONNECTION |
| 7 | MS | MS READER | CONNECTION | NON-CONNECTION |
| 6 | CNVY | CONVEYER | CONNECTION | NON-CONNECTION |
| 5 | DEMPX | CARD SWITCH | CONNECTION | NON-CONNECTION |
| 4 | ICCNO2 | NUMBER OF IC CARD TO BE CONNECTED | SEE FIG.28 | |
| 3 | ICCNO1 | | | |
| 2 | ICCNO0 | | | |
| 1 | EXBUS | EXTENDED BUS | CONNECTION | NON-CONNECTION |
| 0 | EXIO | EXTENDED I/O | CONNECTION | NON-CONNECTION |

FIG.28

| DEMPX | ICCNO2 | ICCNO1 | ICCNO0 | NUMBER OF IC CARD TO BE CONNECTED |
|---|---|---|---|---|
| X | 0 | 0 | 0 | 0 |
| X | 0 | 0 | 1 | 1 |
| X | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |

FIG. 33

| Bit No. | 7 | 6 | 5 | 4 | 3 | 2 | 1 | 0 | INITIAL VALUE |
|---|---|---|---|---|---|---|---|---|---|
| NAME | – | – | – | CDSEL4 | CDSEL3 | CDSEL2 | CDSEL1 | CDSEL0 | |
| CDSEL  002080 | | | | | | | | | bxxx00000 |
| READ/WRITE | – | – | – | R/W | R/W | R/W | R/W | R/W | |

FIG. 34

| CDSEL4 | CDSEL3 | CDSEL2 | CDSEL1 | CDSEL0 | PORT A | PORT B |
|---|---|---|---|---|---|---|
| 0 | 0 | 0 | 0 | 0 | DEMULTIPLEXER RESET | |
| 0 | 0 | 0 | 0 | 1 | CARD 0 SELECTION | CARD 1 SELECTION |
| 0 | 0 | 0 | 1 | 0 | CARD 0 SELECTION | CARD 2 SELECTION |
| 0 | 0 | 0 | 1 | 1 | CARD 0 SELECTION | CARD 3 SELECTION |
| 0 | 0 | 1 | 0 | 0 | CARD 0 SELECTION | CARD 4 SELECTION |
| 0 | 0 | 1 | 0 | 1 | CARD 0 SELECTION | CARD 5 SELECTION |
| 0 | 0 | 1 | 1 | 0 | CARD 1 SELECTION | CARD 0 SELECTION |
| 0 | 0 | 1 | 1 | 1 | CARD 1 SELECTION | CARD 2 SELECTION |
| 0 | 1 | 0 | 0 | 0 | CARD 1 SELECTION | CARD 3 SELECTION |
| 0 | 1 | 0 | 0 | 1 | CARD 1 SELECTION | CARD 4 SELECTION |
| 0 | 1 | 0 | 1 | 0 | CARD 1 SELECTION | CARD 5 SELECTION |
| 0 | 1 | 0 | 1 | 1 | CARD 2 SELECTION | CARD 0 SELECTION |
| 0 | 1 | 1 | 0 | 0 | CARD 2 SELECTION | CARD 1 SELECTION |
| 0 | 1 | 1 | 0 | 1 | CARD 2 SELECTION | CARD 3 SELECTION |
| 0 | 1 | 1 | 1 | 0 | CARD 2 SELECTION | CARD 4 SELECTION |
| 0 | 1 | 1 | 1 | 1 | CARD 2 SELECTION | CARD 5 SELECTION |
| 1 | 0 | 0 | 0 | 0 | CARD 3 SELECTION | CARD 0 SELECTION |
| 1 | 0 | 0 | 0 | 1 | CARD 3 SELECTION | CARD 1 SELECTION |
| 1 | 0 | 0 | 1 | 0 | CARD 3 SELECTION | CARD 2 SELECTION |
| 1 | 0 | 0 | 1 | 1 | CARD 3 SELECTION | CARD 4 SELECTION |
| 1 | 0 | 1 | 0 | 0 | CARD 3 SELECTION | CARD 5 SELECTION |
| 1 | 0 | 1 | 0 | 1 | CARD 4 SELECTION | CARD 0 SELECTION |
| 1 | 0 | 1 | 1 | 0 | CARD 4 SELECTION | CARD 1 SELECTION |
| 1 | 0 | 1 | 1 | 1 | CARD 4 SELECTION | CARD 2 SELECTION |
| 1 | 1 | 0 | 0 | 0 | CARD 4 SELECTION | CARD 3 SELECTION |
| 1 | 1 | 0 | 0 | 1 | CARD 4 SELECTION | CARD 5 SELECTION |
| 1 | 1 | 0 | 1 | 0 | CARD 5 SELECTION | CARD 0 SELECTION |
| 1 | 1 | 0 | 1 | 1 | CARD 5 SELECTION | CARD 1 SELECTION |
| 1 | 1 | 1 | 0 | 0 | CARD 5 SELECTION | CARD 2 SELECTION |
| 1 | 1 | 1 | 0 | 1 | CARD 5 SELECTION | CARD 3 SELECTION |
| 1 | 1 | 1 | 1 | 0 | CARD 5 SELECTION | CARD 4 SELECTION |
| 1 | 1 | 1 | 1 | 1 | LATCH ALL OUTPUTS | |

INTEGRATED CIRCUIT FOR PROTOCOL CONTROL

BACKGROUND OF THE INVENTION

1) Field of the Invention

The present invention relates to a protocol control integrated circuit to be incorporated into a system which makes data-interchange communications with portable type medium, and more particularly to a protocol control integrated circuit for use in a variety of transaction apparatuses capable of handling digital money (electronic money, E-money) and credit transactions, such as ATMs (Automatic Teller Machines), ECRs (Electric Cash Registers), digital money load terminals, electronic purses, POS terminals/ hand-held POS terminals (handy POSs)/POS servers constituting POS (Point Of Sales) systems, with this integrated circuit functioning as an interface device intervening between the aforesaid variety of transaction systems and portable mediums containing digital money [for example, IC (Integrated Circuit) cards].

In recent years, from the standpoint of the safety of settlement, convenience and others, interest has been shown toward so-called digital money which utilizes electronic digital data as cash and yet which serves as a settlement means replacing such currency as paper money and coinage, and it has been put to practical use in various approaches different in an issuing mode, circulation mode or settlement mode. A different approach requires a different protocol dealing with the digital money.

For this reason, systems, dealing with digital money, have needed the emergence of a standard component which enables easy processing of a plurality of types of digital money different in protocol from each other.

2) Description of the Related Art

As noted above, in recent years, various apparatuses, such as ATMs, ECRs, digital money load terminals, electronic purses, POS terminals, handy POSs, POS servers, and others, have been developed as a transaction system handling digital money defined as a symbol of electronic currency.

Because each of these apparatuses needs a different specification such as its CPU performance and display performance, the design of a CPU, a memory, a display control circuit, an input control circuit, an IC card control circuit, and others have been made to establish the optimal specification for each apparatus. Additionally, there has been a need to create programs for controlling these circuits.

Furthermore, while various types of digital money have been put to practical use as mentioned above, each of these types requires a different protocol for handling that digital money. Accordingly, a need for a different control program in the apparatus, which handles that digital money, arises from the difference among the digital money types.

In most cases, in manufacturing an apparatus which handles digital money, there is a need to gain approval of the digital money specification making side or the like in a design process for that apparatus at every apparatus and digital money type. Additionally, for gaining this approval, there is a need to perform various verifications (confirmation work) as to whether or not the control programs are properly produced on the basis of a protocol prescribed for each type, or whether or not the control is correctly run in terms of the error check, and further to present the verification results.

However, the following objects and requests have existed heretofore.

(1) Because of the requirement of development of a control program for each apparatus, a large number of test man-hours (or man-days), that is, design and development man-hours, should be taken for the purpose of securing the reliability at the development of the control program. Additionally, in the case that one apparatus deals with a plurality of models of digital money different in mode (protocol), a need for developing a control program exists at every mode of digital money, and, naturally, like tests must be run in terms of the control program associated with each protocol, thus resulting in increased test man-hours.

(2) If a need for approval exists, gaining the approval requires the exhibition of an extremely great deal of verification results depending upon the mode of digital money, and the confirmation operations to obtain such verification results reach an enormous number of man-hours. Moreover, in the case that one apparatus handles a plurality of models of digital money different in mode (protocol), the approval at every mode contributes to a further increase in the number of man-hours for the foregoing confirmation operations.

(3) A control logic or a cipher key for a digital money control program is preferable to be retained invisibly from the external from the viewpoint of security and, for this reason, it is necessary to take measures for security, such as by covering the entire apparatus or the periphery of a CPU or a memory with a resin. However, the covering of the entire apparatus leads to a large-scale operation. Hence, the range for effecting the security is desirably limited as much as possible.

SUMMARY OF THE INVENTION

The present invention has been developed with a view to eliminating these problems, and it is therefore an object of this invention to provide a protocol control integrated circuit capable of reducing the number of design and development man-hours for various types of apparatuses and of reducing the number of approval man-hours of an approval organization or the like (verification man-hours to be taken for obtaining an approval) concurrently with improving reliability and with realizing a high security performance in a manner of integrating or unifying, on or into one chip, hardware and control programs (software) needed for data communications in a plurality of modes different in protocol and of utilizing this chip (integrated circuit) in common among a variety of apparatuses.

For this purpose, in accordance with the present invention, there is provided a protocol control integrated circuit to be incorporated into an apparatus capable of handling digital money defined as a symbol of electronic currency, and configured by integrating, on one chip, a storage section for storing a control program prepared for or in corresponding relation to protocols for a plurality of digital money different in mode, a processing section for controlling the handling of the plurality of digital money, different in mode, by executing the control program stored in the storage section, and an interface circuit connected to an external circuit including at least one of an external processing section and an external storage section to fulfill an interface function between the external circuit and the processing section.

With this protocol control integrated circuit according to the present invention, because hardware (interface circuits and peripheral control circuits) and software (a control program prepared for protocols for a plurality of digital money different in mode) necessary for handling digital money are integrated on one chip to construct an integrated circuit, there results in production of an integrated circuit exhibiting an extremely high versatility or flexibility, which allows the use in common among various types of digital-money handling transaction apparatuses, considerable reduction of design and development man-hours to be taken for the various transaction apparatuses, and considerable reduction in the number of approval man-hours in the approval organization or the like (verification man-hours for gaining approval), coupled with improving reliability and realizing a high security performance.

Furthermore, in accordance with the present invention, there is provided a protocol control integrated circuit to be incorporated into an apparatus which conducts data interchange through communication with a portable type medium, and configured by integrating, on one chip, a storage section for storing a control program prepared for protocols for a plurality of data communications different in mode, a processing section for controlling the plurality of data communications, different in mode, by executing the control program stored in the storage section, and an interface circuit connected to an external circuit including at least one of an external processing section and an external storage section to fulfill an interface function between the external circuit and the processing section.

With this protocol control integrated circuit according to the present invention, hardware, control programs and software necessary for achieving a plurality of types of data communications different in protocol, are integrated on one chip, which presents an integrated circuit exhibiting an extremely high versatility, and which allows the use in common among various types of apparatus which perform data interchange through communications with portable type mediums, considerable reduction of the number of design and development man-hours to be taken for the various transaction apparatus, and considerable reduction of number of the approval man-hours in the approval organization or the like (verification man-hours for gaining approval), along with improving reliability and realizing a high security performance.

BRIEF DESCRIPTION OF THE DRAWINGS

FIG. 18 is an explanatory view illustrating one example of transaction processing to be conducted through the use of the protocol controller according to this embodiment;

FIG. 19 is an explanatory view illustrating another example of transaction processing to be conducted through the use of the protocol controller according to this embodiment;

FIG. 27 is an illustration useful for explaining the meaning of each of bits of the configuration information register in the protocol controller according to this embodiment;

FIG. 28 is an illustration useful for explaining the meaning of each of bits of the configuration information register in the protocol controller according to this embodiment;

FIG. 33 is an illustration of a configuration of an IC card port allocation register (CDSEL) to be employed at the output of a select signal to the demultiplexer in the protocol controller according to this embodiment;

FIG. 34 is an illustration for explaining the meaning of each of bits of the IC card port allocation register in the protocol controller according to this embodiment.

DESCRIPTION OF THE PREFERRED EMBODIMENTS

FIGS. 1 to 10 are block diagrams each for describing an aspect of this invention.

Figure 1:
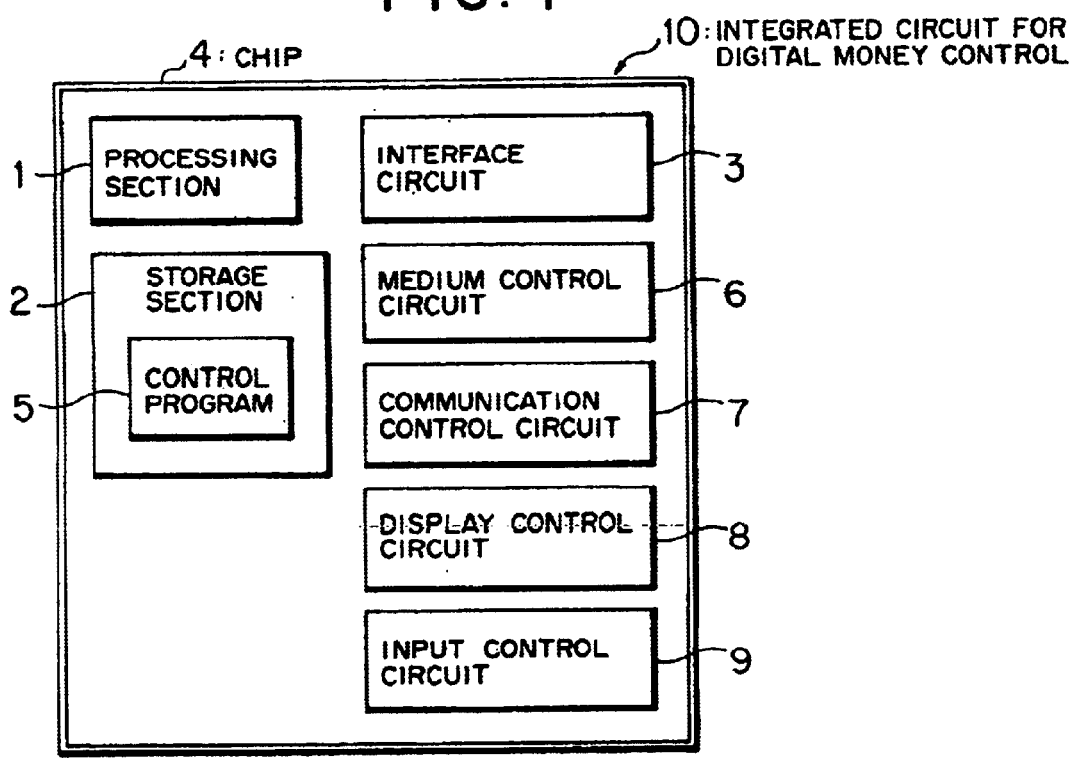
FIGS. 1 to 10 are block diagrams each showing an aspect of the present invention.

A protocol control integrated circuit according to this invention, designated generally at the reference numeral 10 in FIG. 1, is designed to be incorporated into an apparatus capable of handling digital memory defined as a symbol of electronic currency, and is configured by integrating at least a processing section 1, a storage section 2 and an interface circuit 3 on one chip 4.

In this instance, the storage section 2 is for storing a control program 5 prepared for protocols for a plurality of digital money different in mode or approach from each other, while the processing section 1 is for controlling the handling of the plurality of digital money protocols different in mode by running the control program 5 stored in the storage section 2. Further, the interface circuit 3 is connected to an external circuit including at least one of an external processing section and an external storage section (see the reference numeral 11 in FIG. 2) to fulfill an interface function between this external circuit and the processing section 1.

In this case, it is also appropriate to construct an integrated circuit 10 by integrating, on the chip 4, additional peripheral control circuits for performing a control function related to the processing for digital money. In the integrated circuit 10 shown in FIG. 1, as the peripheral control circuits, there are included a medium control circuit 6, a communication control circuit 7, a display control circuit 8, and an input control circuit 9.

Figure 8:
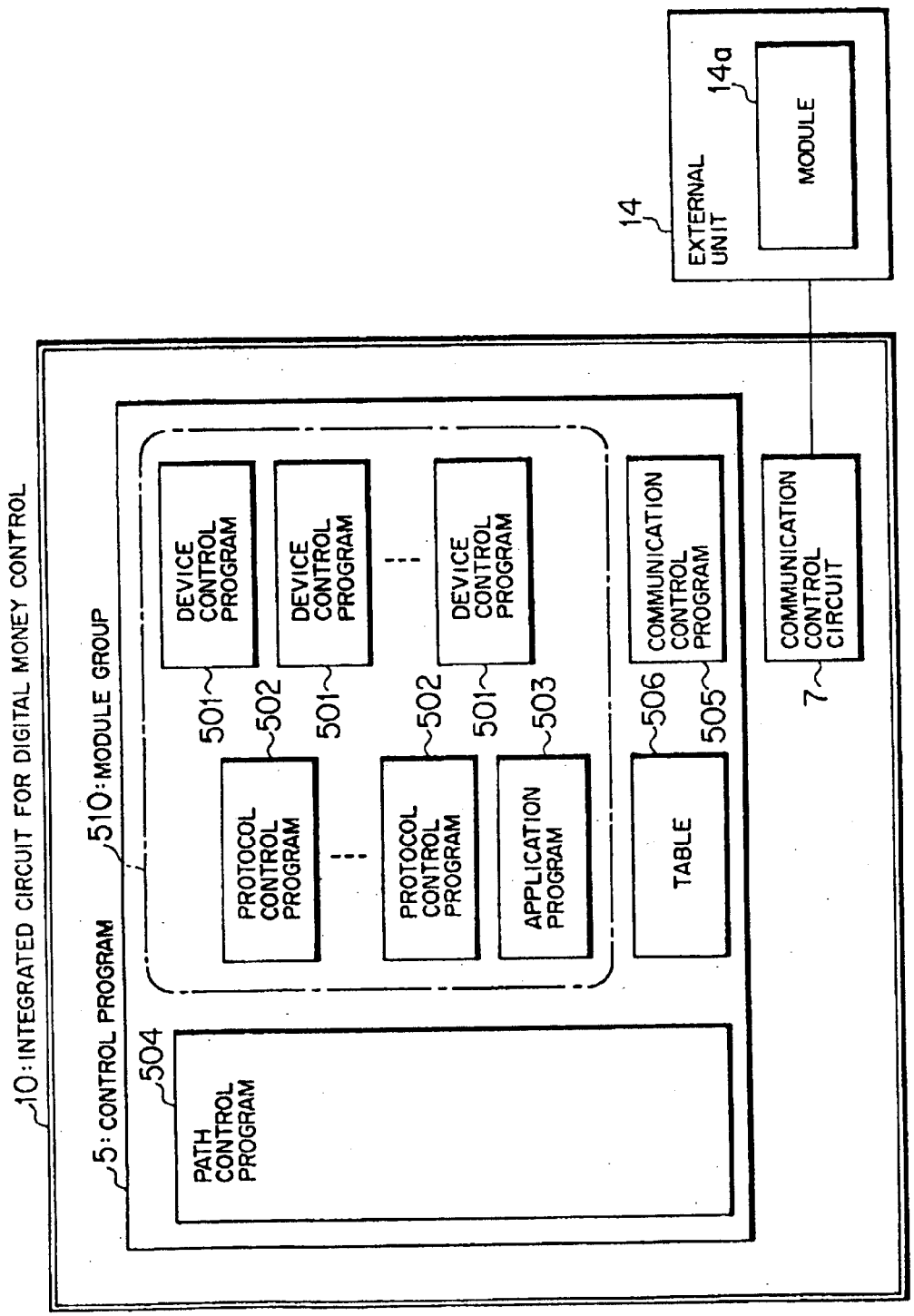

The medium control circuit 6 undergoes control of the processing section 1 and the control program 5, and is for executing control to a portable type medium retaining digital money, while the communication control circuit 7 likewise works under control of the processing section 1 and the control program 5, and is for controlling communications with external units (see the reference numeral 14 in FIG. 8). Moreover, the display control circuit 8 likewise operates under control of the control section 1 and the control program 5, and is for controlling an external display unit, while the input control circuit 9 is similarly controlled by the processing section 1 and the control program 5, and is for conducting input processing of a signal from an external input unit.

Besides, logical cutoff takes place between the storage section 2 and an external connection terminal of the integrated circuit 10, and the control program 5 is put in the storage section 2 at the manufacture of the integrated circuit 10.

Figure 2:
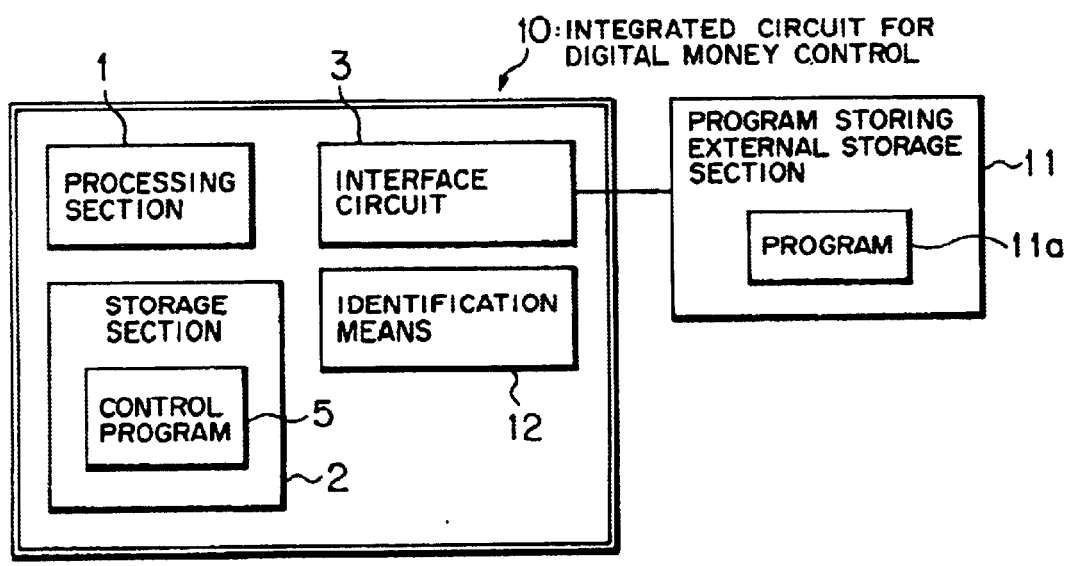

As FIG. 2 shows, the integrated circuit 10 according to this invention contains an identification means 12 to check whether or not a program storing external storage section 11 is connected through the interface circuit 3 as an external circuit, and if this identification means 12 judges that the external storage section 11 is in connection, the processing section 1 can run a program 11*a* existing in the external storage section 11. At this time, the identification means 12 reads one or more logical addresses allocated in advance for connection with the program storing external storage section 11, and compares a value forming the reading result with a predetermined value, thereby making a decision to or on the connection/non-connection of the program storing external storage section 11.

Figure 3:
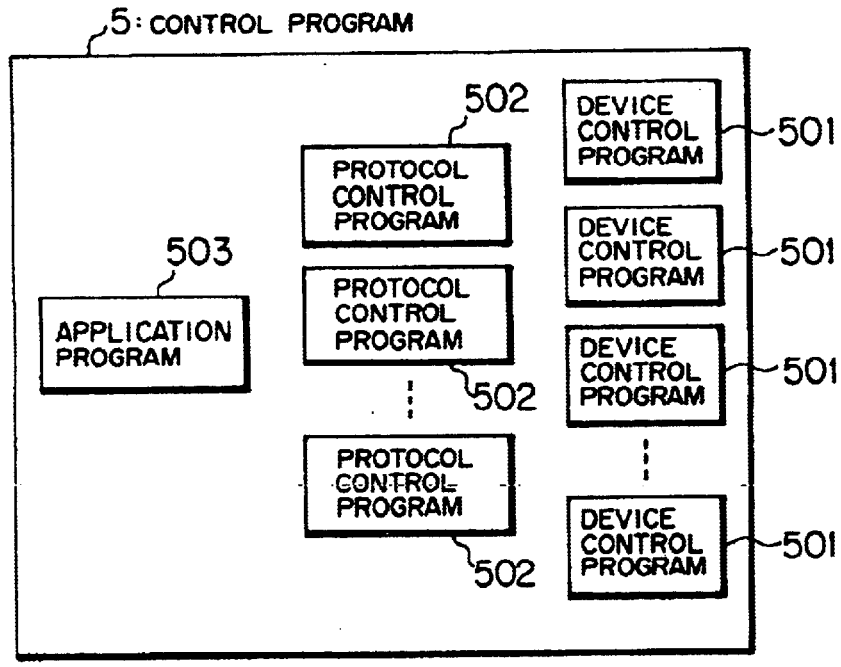

As FIG. 3 shows, the control program 5 to be stored in the storage section 2 can be composed of one or more device control programs 501 for controlling an external circuit or a peripheral control circuit, serving as a device, connected to the interface circuit 3, a plurality of kinds of protocol control programs 502 for controlling the device control programs 501 in one-by-one correspondence to a plurality of digital money different in mode, and an application program 503 for controlling the device control programs 501 and the protocol control programs 502.

Figure 4:
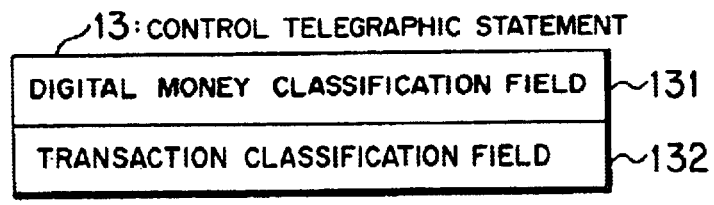

At this time, when the application program 503 receives a control telegraphic statement (or message) 13 including, as shown in FIG. 4, a digital money classification field 131 for designating one of a plurality of kinds of digital money different in mode and a transaction classification field 132 for specifying a transaction classification common to the plurality of kinds of digital money different in mode, a transaction specified by the transaction classification field 132 is made by the protocol control program 502 corresponding to the digital money designated by the digital money classification field 131.

Figure 5:
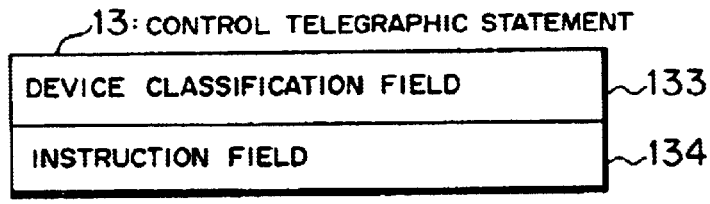

On the other hand, when the application program 503 receives a control telegraphic statement 13 including, as shown in FIG. 5, a device classification field 133 for designating the device control program 501 and an instruction field 134 in which described is a control instruction to the device control program 501, it communicates the instruction, described in the instruction field 134, to the device control program 501, designated by the device classification field 133, to make the device control program 501 execute the instruction and transmits a response to the instruction from the device control program 501 to the instruction issuer in the form of a response telegraphic statement.

Figure 6:
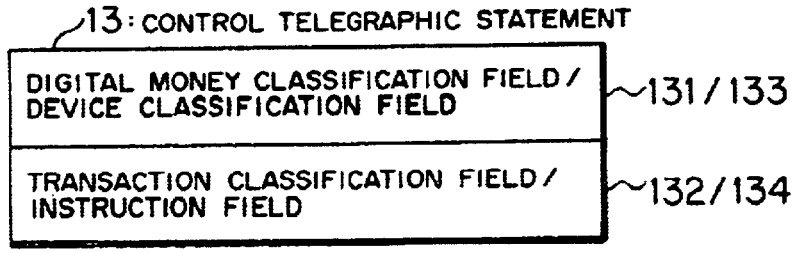

Besides, it is also appropriate that, as shown in FIG. 6, in the control telegraphic statement 13, both the digital money classification field 131 and device classification field 133 are placed in the common field and the designation data for when that field is used as the digital money classification field 131 and the designation data for when that field is employed as the device classification field 133 are taken mutually as exclusive values. Further, in this instance, it is also acceptable that, as shown in FIG. 6, in the control telegraphic statement 13, the transaction classification field 132 and the instruction field 134 are placed in the common field.

Figure 7:
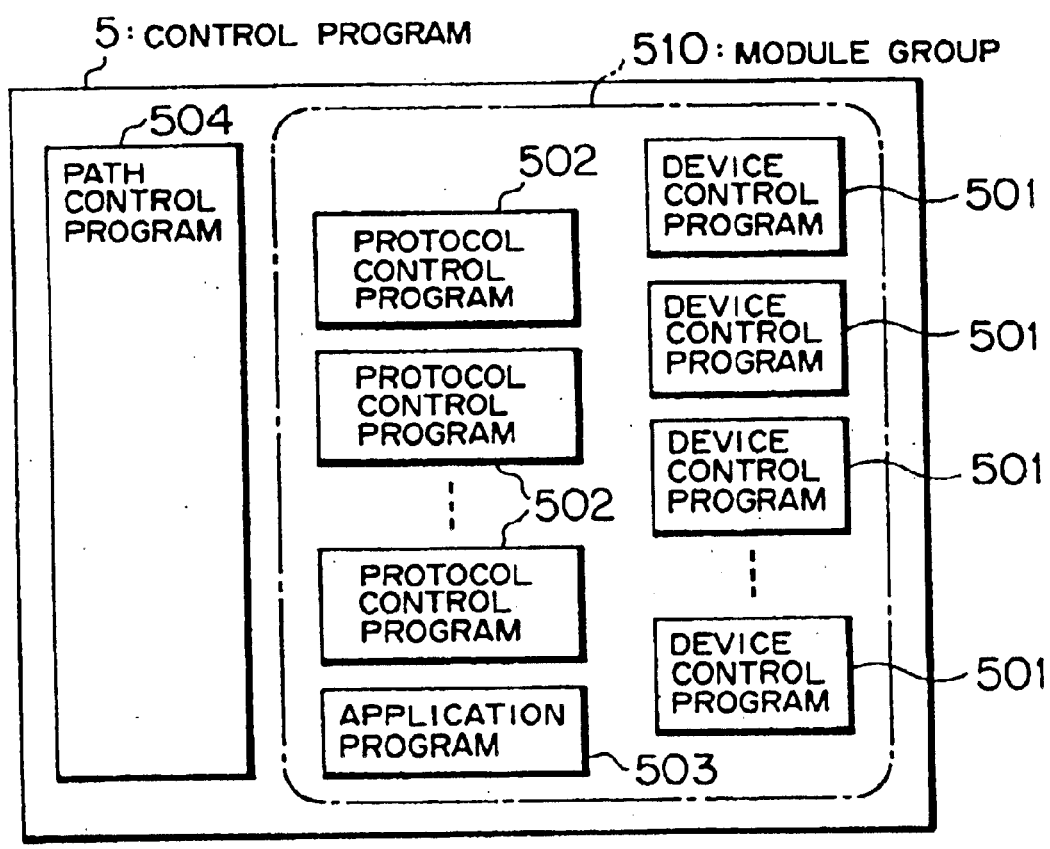

It is also appropriate that, as shown in FIG. 7, the control program 5 includes device control programs 501, protocol control programs 502 and an application program 503 in the form of modules (see a module group 510) and additionally has a path control program 504 for presenting an interface feature capable of establishing interconnections between these modules, while a peculiar module identifier is given to each of the modules so that the path control program 504 accomplishes the interconnections between the modules by using the module identifier of the connection-requesting module and the module identifier of the connection-accepting module as parameters.

Furthermore, the following configuration is also acceptable. That is, as shown in FIG. 8, the integrated circuit 10 includes, as a peripheral control circuit, a communication control circuit 7 for controlling the communications with an external unit 14, while the control program 5 includes a module group 510 and a path control program 504 as in the case shown in FIG. 7 and, additionally, bears a communication control program 505 for controlling a communication control circuit 7. In the case that a connection-accepting module 14*a* resides in the external unit 14, the path control program 504 makes a connection between the connection-requesting module in the integrated circuit 10 and the connecting-accepting module 14*a* in the external unit 14 through the communication control circuit 7 undergoing control by the communication control program 505. In addition, the communication control program 505 is included as one of the device control programs 501 in the module group 510.

In this case, a peculiar module identifier is given to each of the modules (module group 510) residing in the integrated circuit 10 and further to each of the modules 14*a* lying in the external unit 14 while a peculiar path identifier is presented to the integrated circuit 10 and further to the external unit 14 so that the path control program 504 sets up an interconnection between the modules in a manner of using the module identifier of the connection-requesting module, the module identifier of the connection-accepting module 14a and the path identifiers as parameters.

Moreover, the following arrangement is also acceptable. That is, as shown in FIG. 8, the control program 5 has a table 506 which retains correspondence between a module identifier and a path identifier representing the integrated circuit 10 or the external unit 14 to which a module with the same module identifier pertains, while the path control program 504 retrieves the table 506 on the basis of the module identifier of the connection-accepting module 14a to obtain the path identifier corresponding to the module identifier of the connection-accepting module 14a. If that path identifier coincides with the path identifier of the integrated circuit 10, then the path control program 504 makes a connection between the connection-requesting module and the connecting-accepting module within the integrated circuit 10. On the other hand, if that path identifier does not coincide with the path identifier of the integrated circuit 10, then it makes a judgment that the connection-accepting module 14a belongs to the external unit 14, and thereby makes a connection between the connection-requesting module in the integrated circuit 10 and the connection-accepting module 14a in the external unit 14 through the use of the communication control circuit 7.

Besides, it is also possible that the correspondence to be retained in the table 506 is made to accept setting/change through a telegraphic statement received in the communication control circuit 7, or that the table 506 is stored in an external storage section connected through the interface circuit 3 and used as an external circuit.

Figure 9:
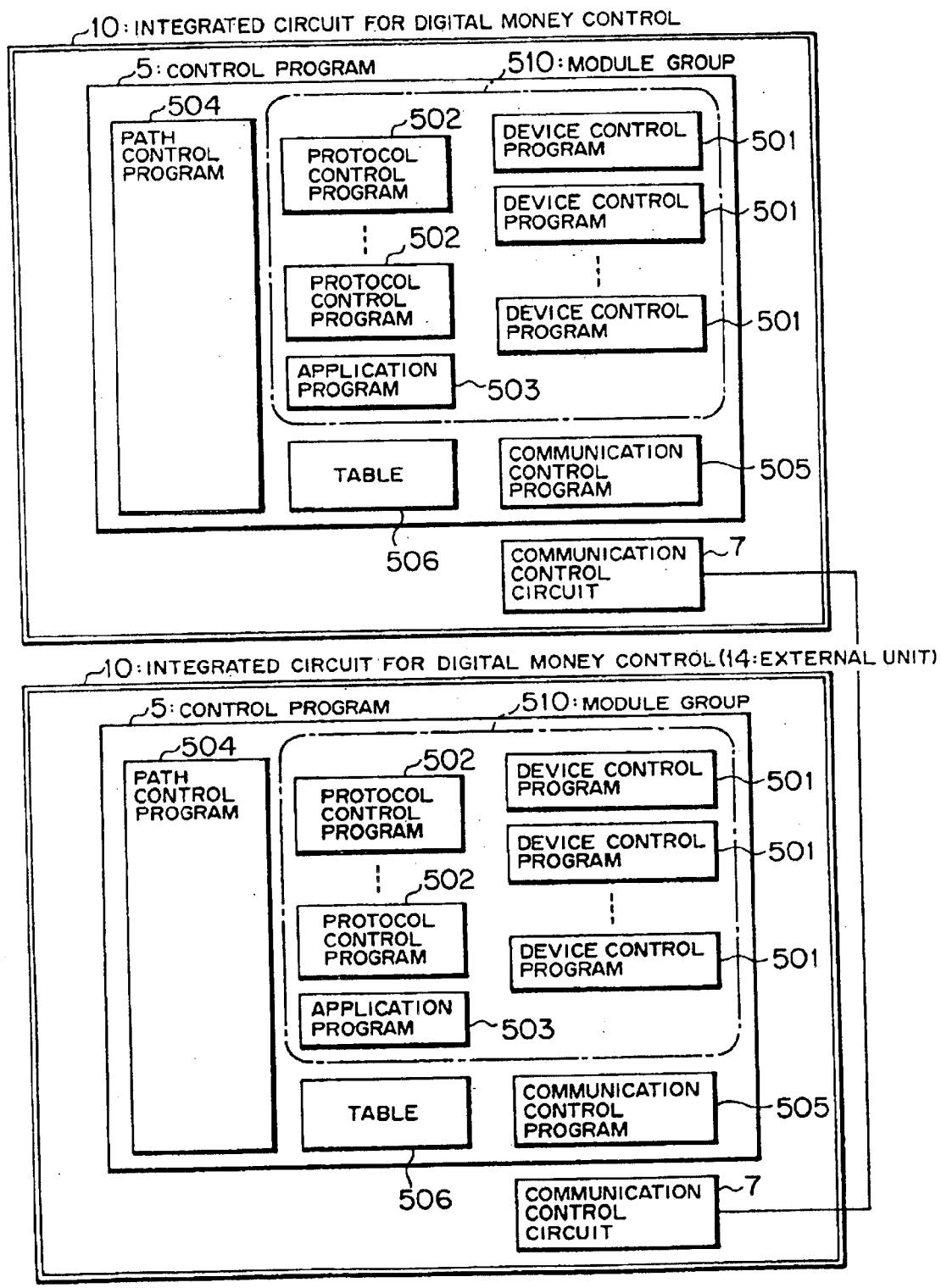

The external unit 14 shown in FIG. 8 can also be a processing unit (for example, a personal computer) exhibiting the same function as that of the integrated circuit 10 in the same illustration, or, as shown in FIG. 9, it can also be another integrated circuit 10 having the same configuration as that of the integrated circuit 10 shown in FIG. 8.

Figure 10:
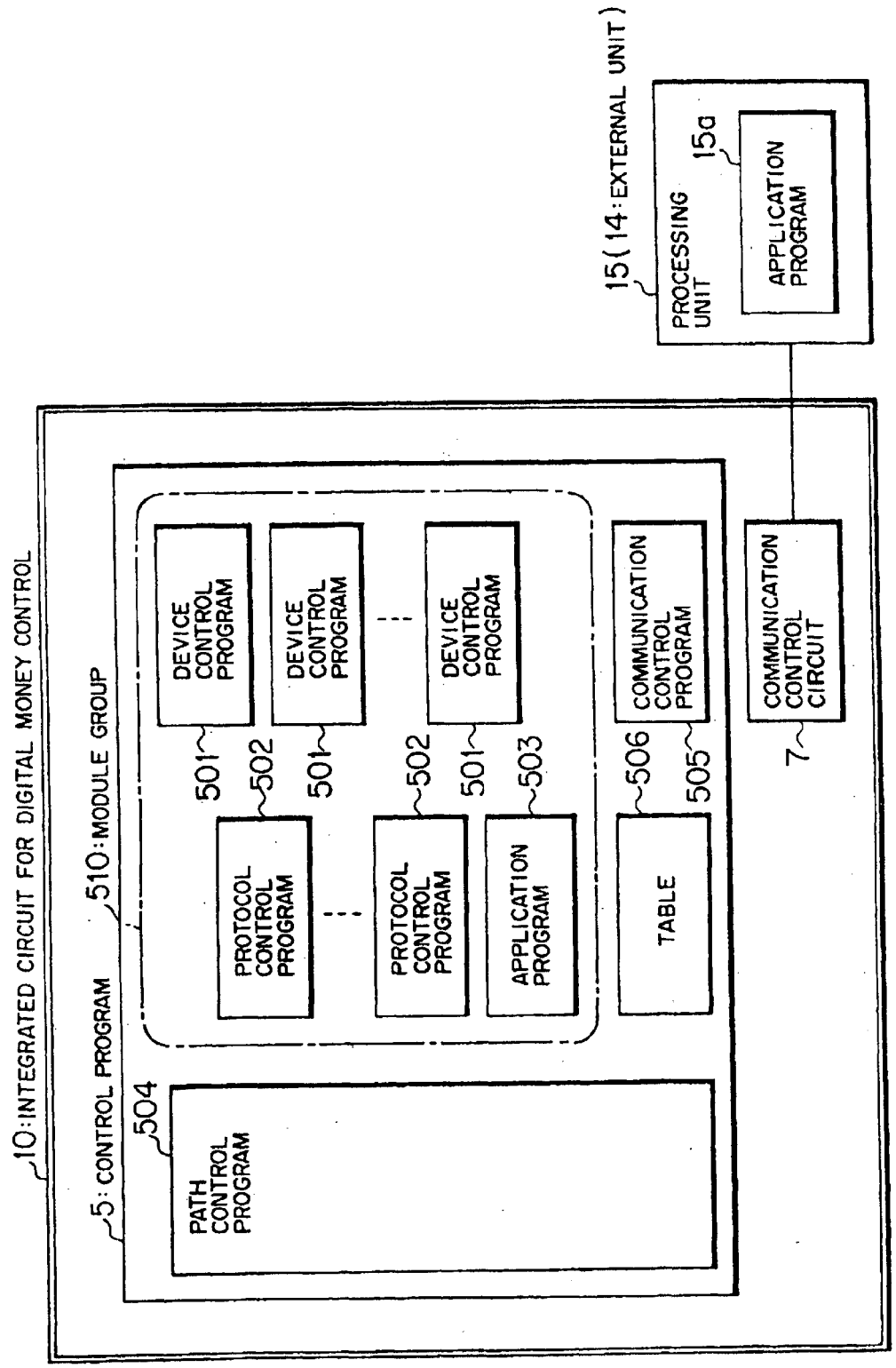

Moreover, if, as shown in FIG. 10, the external unit 14 shown in FIG. 8 forms a processing unit 15 retaining an application program 15a capable of issuing a connection request for a connection with a module pertaining to the integrated circuit 10 to the path control program 504 of the integrated circuit 10, and when the path control program 504 receives this connection request from the processing unit 15 through the communication control circuit 7 under control of the communication control program 505, the connection between that module of the integrated circuit 10 and the processing unit 15 is also possible.

Furthermore, the protocol control integrated circuit according to the present invention is to be built in an apparatus interchanging data with portable type mediums in communication ways, and is configured by integrating, on one chip, a storage section for storing a control program produced for protocols for a plurality of data communications different in mode, a processing section for controlling data communications, different in approach from each other, by running the control program put in this storage section, and an interface circuit connected to an external circuit including at least one of an external processing section and an external storage section for fulfilling an interface function between this external circuit and the processing section.

The protocol control integrated circuit 10 according to the present invention, thus constructed, can offer the following effects.

(1) Not only a plurality of kinds of digital money different in mode can be handled by one integrated circuit 10, but also this integrated circuit 10 can be used in common among various types of transaction apparatuses capable of dealing with digital money.

(2) A part common to various types of transaction apparatuses is more enlargeble in a manner that a peripheral control circuit is additionally built in the integrated circuit 10.

(3) If the storage section 2 storing the control program 5 in the integrated circuit 10 is constructed as a mask ROM, it is possible to inhibit the access to the control program 5 from the exterior of the integrated circuit 10, which can ensure its security.

(4) Because the connection of the program storing external storage section 11 to the integrated circuit 10 is possible, higher extendibility of the integrated circuit 10 becomes achievable.

(5) The employment of the control telegraphic statement 13 enables the designation of the classification or kind of the digital money to be used (protocol control program) from the exterior of the integrated circuit 10.

(6) Because the use of the control telegraphic statement 13 allows various types of peripheral control circuits built in the integrated circuit 10 to be directly controllable from the outside, it is possible to conduct processing other than the processing for each kind of digital money (for example, processing using an IC card reader/writer independently of digital money processing).

(7) Along with the incorporation of a single integrated circuit 10 into an transaction apparatus or the like, not only an integrated circuit 10 can be connected to a host unit (external unit), but also a plurality of integrated circuits 10 can be connected to a host unit (external unit) in a cascade fashion; therefore, a construction of a system becomes possible with an extremely high flexibility.

(8) One integrated circuit permits a plurality of data communications in different modes, and can be put to use in common among various types of apparatuses interchanging data with portable type mediums through communications.

Thus, with the protocol control integrated circuit according to the present invention, because an integrated circuit 10 is configured by integrating, on one chip 4, hardware (the interface circuit 3 and the peripheral control circuits 6 to 9) and software (the control program 5 prepared for protocols for a plurality of digital money different in mode) necessary for handling digital money, that integrated circuit can exhibit an extremely high flexibility and can be put to use in common among various types of digital money handling transaction apparatus, which achieves a considerable reduction in the number of man-hours for the design and development of each transaction apparatus concurrently with sharp reduction in the number of man-hours for approval in an approval organization or the like (the verification man-hour for gaining the approval), and yet which improves its reliability and realizes a high security performance.

In addition, with the protocol control integrated circuit according to the present invention, because of integrating, on one chip 4, the hardware, the control program and software necessary for a plurality of types of data communications different in protocol from each other, the resulting integrated circuit can display an extremely high flexibility and, additionally, can be put to use in common among various types of apparatuses interchanging data with portable type mediums through communications, there results in the considerable reduction in the number of man-hours for the design and development of various types of apparatus and the significant reduction of the man-hour for the approval in an approval organization or the like (the verification man-hour for gaining the approval), coupled with the improvement of its reliability and the realization of its high security performance.

Figure 11:
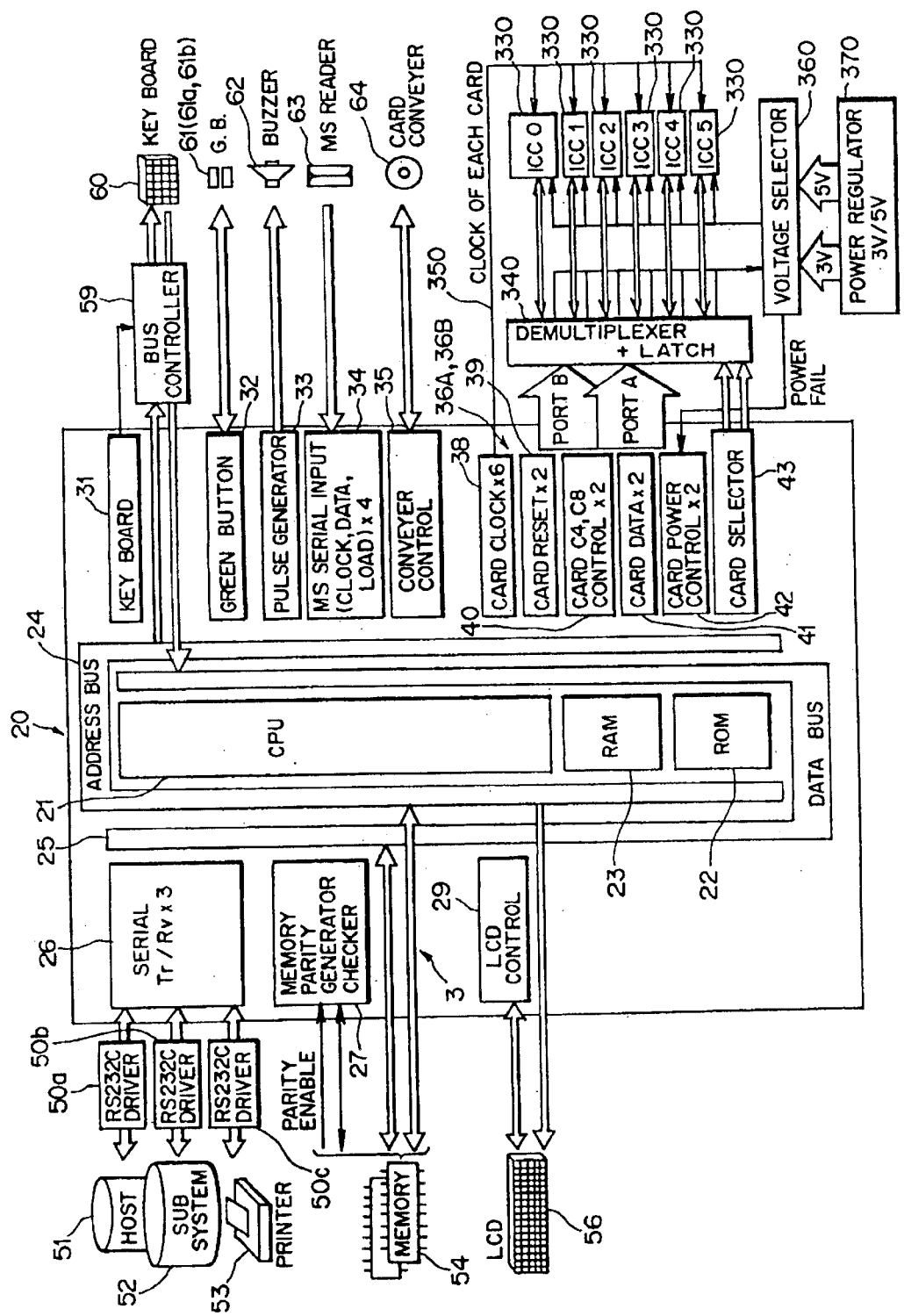
FIG. 11 illustratively shows a configuration of a protocol control integrated circuit (protocol controller) according to an embodiment of this invention.

[1] Description of Protocol Control Integrated Circuit (Protocol Controller) According to an Embodiment FIG. 11 illustratively shows a configuration of a protocol control integrated circuit (protocol controller) according to an embodiment of the present invention.

A protocol control integrated circuit according to this embodiment (which will be referred hereinafter to as a protocol controller), denoted generally at the reference numeral 20 in FIG. 11, is designed to be incorporated into a transaction apparatus (for example, ATMs, ECRs, digital money load terminals, electronic purses, POS terminals, handy POSs, POS servers, and others) handling digital money defined as a symbol of electronic currency, and to be used in common. Its detailed configuration will be described hereinbelow with reference to FIG. 11.

The protocol controller 20 has a configuration in which integrated on one chip are a CPU 21, a ROM 22, a RAM 23, an address bus 24, a data bus 25 and an interface circuit 3, along with circuits 26, 27, 29, 31 to 35, 36A, 36B, 38, 42 and 43, serving as peripheral control circuits, which will be described herein later.

Figure 13:
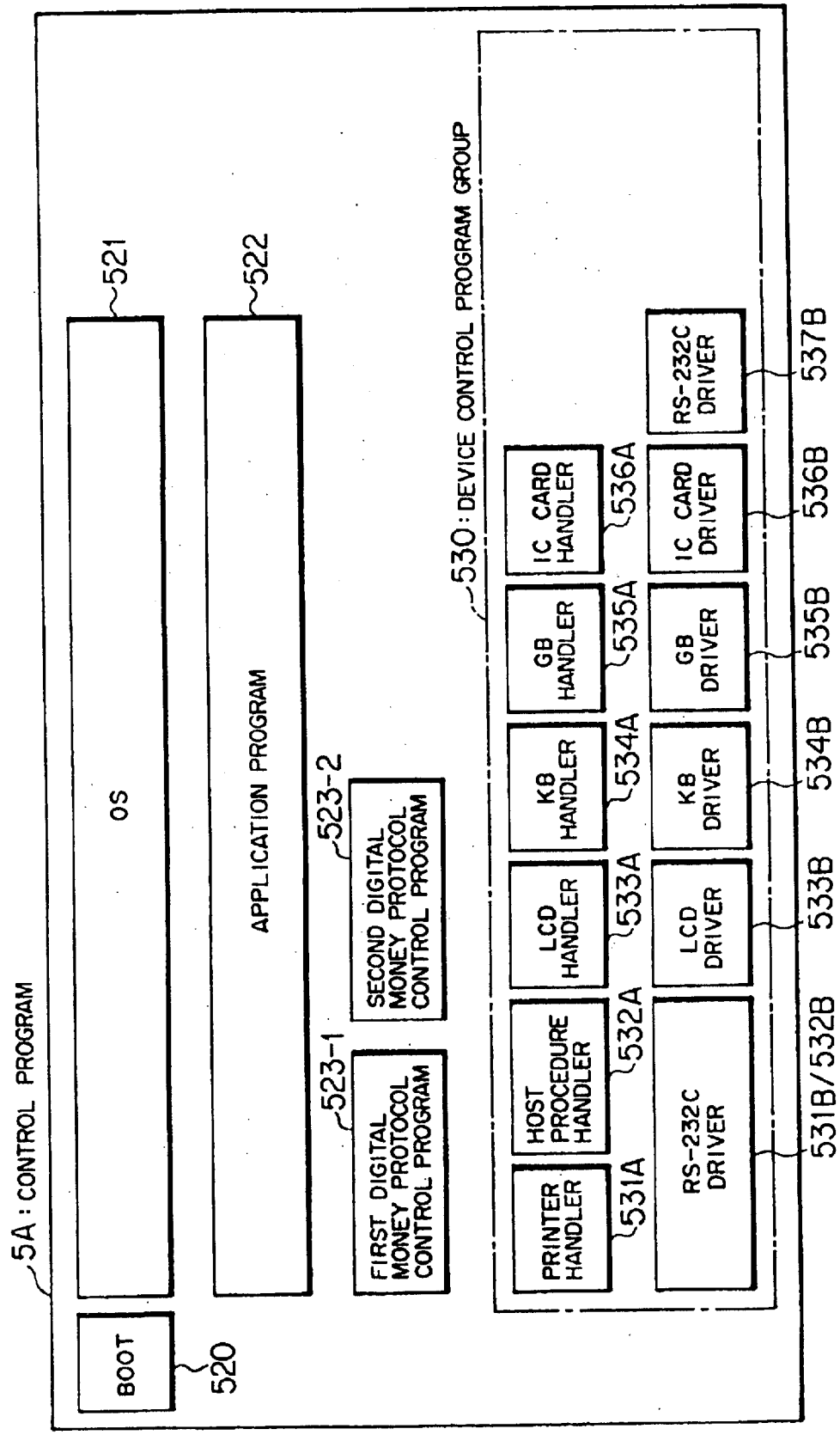
FIG. 13 is a block diagram showing a configuration of a control program in the protocol controller according to this embodiment.
Figure 15:
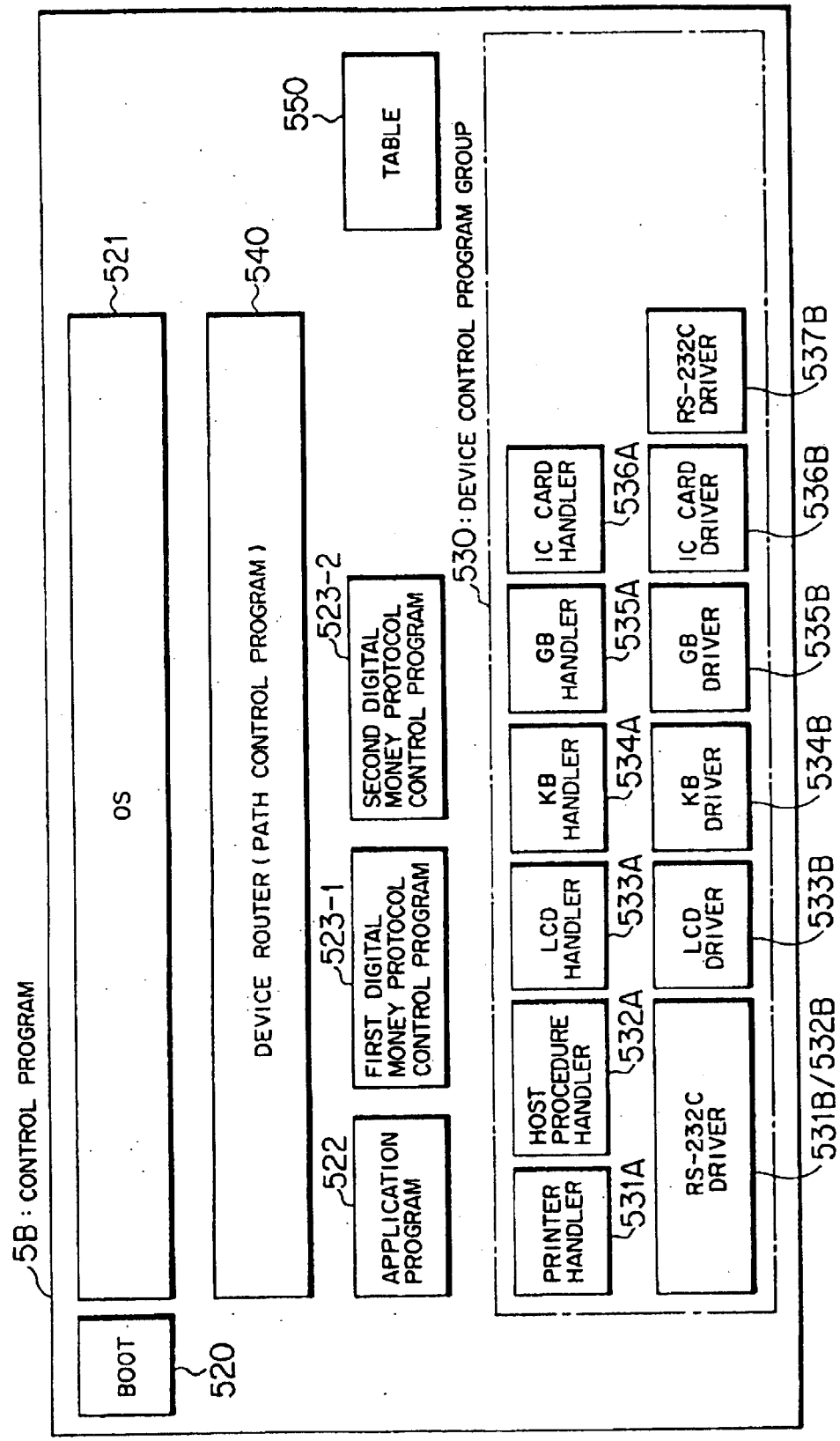
FIG. 15 is a block diagram showing another example of configuration of a control program in the protocol controller according to this embodiment.

The ROM (storage section) 22 is for storing a control program 5A or 5B prepared for protocols for a plurality of kinds of digital money different in mode (see FIG. 13 or 15). The structures of the control programs 5A and 5B will be described herein later with reference to FIGS. 13 and 15, respectively.

Besides, in this embodiment, in order to cover two modes of digital money as first and second kinds of digital money, respectively, each of the control programs 5A, 5B is produced in corresponding relation to a protocol for each kind of digital money.

Additionally, a logical cutoff takes place between the ROM 22 and an external connection terminals of the protocol controller 20, and the control programs 5A, 5B are written at the time of the fabrication of the protocol controller 20. That is, the ROM 22 in the protocol controller 20 according to this embodiment is constructed in the form of a mask ROM.

The CPU (processing section) 21 is, for example, of a 16-bit type, and is for controlling the treatments of the first kind of digital money and the second kind of digital money by controlling the operations of various types peripheral control circuits mounted on the protocol controller 20.

The RAM 23 is to be used as a working area of the CPU 21, or for other purposes.

The interface circuit 3 is connected to an external circuit, such as an external storage section or an external memory (external storage section) 54 to perform an interface function between this external circuit and the CPU 21. In the case of FIG. 11, the external memory 54 is connected as the external circuit to the protocol controller 20. In this instance, as the external memory 54 to be connected thereto, for example, there are an exterior type ROM 54a, an exterior type RAM 54b, an FROM (FLASH ROM) 54c, and other memories (see FIG. 23). Incidentally, the exterior type ROM 54a is to be used as a program storing external storage section for storing a program, such as an OS.

The address bus 24 and the data bus 25 establish interconnections among the CPU 21, the ROM 22, the RAM 23, the interface circuit 3, and the circuits 26, 27, 29, 31 to 35, 36A, 36B, 38, 42 and 43, which will be described herein later, thereby effecting the interchange of addresses/data.

Each of the peripheral control circuits, provided in the protocol controller 20 according to this embodiment, is for fulfilling a control function related to the digital money processing. Concretely, such circuits 26, 27, 29, 31 to 35, 36A, 36B, 38, 42 and 43 are provided as the peripheral control circuits.

Each of serial transmission/receive control circuits (communication control circuits) 26 operates under control of the CPU 21 and the control programs 5A, 5B, and is for controlling communications with external units (for example, a host system 51, a sub-system 52, a printer 53, and others). The protocol controller 20 according to this embodiment is equipped with three communication ports (see P0, P1 and P2 in FIG. 17), and is provided with three serial transmission/receive control circuit (Serial Tr/Rv) 26 respectively corresponding to the three ports.

Besides, the transmission/receive between each of the serial transmission/receive control circuits 26 and each of three external units (the host system 51, the sub-system 52 and the printer 53) is done through each of RS232C drivers 50a to 50c. Further, the host system 51 is, for example, an ATM, a POS terminal, or the like, while the sub-system 52 is, for example, another IC card reader/writer, or the like, and even, the printer 53 is, for example, for printing receipts. Additionally, programs (device control programs, a communication control program) for controlling the serial transmission/receive control circuits 26 involve a printer handler 531A, a HOST procedure handler 532A and RS232C drivers 531B/532B, 537B in the control program 5A or 5B (see FIG. 13 or 15).

A memory parity generator checker 27 is for performing parity check in the external memory 54 (RAM 43b) connected to the protocol controller 20 while undergoing control of the CPU 21 and the control programs 5A, 5B.

An LCD control circuit (display control circuit) 29 is for controlling a controller built-in type LCD (Liquid Crystal Display) 56, serving as a display unit connected to the protocol controller 20, while undergoing control of the CPU 21 and the control programs 5A, 5B. Control programs (device control programs) for controlling this LCD control circuit 29 involve an LCD handler 533A and an LCD driver 533B in the control program 5A or 5B (see FIG. 13 or 15).

A keyboard control circuit (input control circuit) 31 is for conducting input processing of a signal from a keyboard (KB) 60, serving as an input device, through a bus control circuit 59 under control of the CPU 21 and the control programs 5A, 5B. Programs (device control programs) for controlling this keyboard control circuit 31 include a KB handler 534A and a KB driver 534B in the control program 5A or 5B (see FIG. 13 or 15).

A green button control circuit (input control circuit) 32 works under control of the CPU 21 and the control programs 5A, 5B to conduct input processing of a signal from a green button (GB) 61, being an input unit connected to the protocol controller 20, and additionally to execute control on lighting/lighting-out of this green button 61 and others. Programs (device control programs) for controlling this green button control circuit 32 include a GB handler 535A and a GB driver 535B in the control program 5A or 5B (see FIG. 13 or 15). Incidentally, the green button 61 actually comprises two buttons 61a, 61b, which are for confirming whether or not the user has an intention to render a payment of the utilization of digital money or the like, and which are controlled to light in green when urging the user for operation.

A pulse generator (display control circuit) 33 operates under control of the CPU 21 and the control programs 5A, 5B to generate a pulse signal for actuating a buzzer 62 acting as a display unit to be coupled to the protocol controller 20, thereby making the buzzer 62 sound.

MS serial input control circuits 34 work under control of the CPU 21 and the control programs 5A, 5B to conduct input processing of a signal from a magnetic stripe reader (MS reader) 63 serving as an input unit to be connected to the protocol controller 20, with the protocol controller 20 according to this embodiment being equipped with four MS serial input control circuits 34 for dealing simultaneously with MS read data corresponding to four tracks.

A card conveyer control circuit 35 is subjected to control of the CPU 21 and the control programs 5A, 5B, and is for controlling the operation of a card conveyer 64 to be connected to the protocol controller 20. Incidentally, the card conveyer 64 is for conveying IC cards 330, for example, in an IC card reader/writer.

IC card control circuits (medium control circuits) 36A, 36B undergo control of the CPU 21 and the control programs 5A, 5B to execute control related to the IC cards (portable type mediums) 330 accommodating digital money. In the protocol controller 20 according to this embodiment, two ports A and B are prepared for purpose of directly dealing with two IC cards 330, while the two IC card control circuits 36A, 36B are provided in terms of these ports A, B, respectively. Programs (device control programs) for controlling these IC card control circuits 36A, 36B involve an IC card handler 536A and an IC card driver 536B in the control program 5A or 5B (see FIG. 13 or 15). Incidentally, the IC cards are based upon, for example, ISO7816.

Each of these IC card control circuits 36A, 36B is composed of a card reset control circuit 39, a card C4/C8 control circuit 40 and a card data input/output control circuit 41.

The two ports A, B in the protocol controller 20 are, as data transfer signal lines, equipped with a data line, a C4 signal line, a C8 signal line and a reset signal line (one for each). The card reset control circuit 39 is for controlling a reset signal to be outputted through the aforesaid reset signal line to the IC card 330, while the card C4/C8 control circuit 40 is for output-controlling a C4/C8 signal to the IC card 330 through the C4 signal line or the C8 signal line, and is further for input-controlling the C4/C8 signal from the IC card 330 therethrough, and even the card data input/output control circuit 41 is for executing serial output control of data to the IC card 330 through the aforesaid data line, and is additionally for performing serial input control of data from the IC card 330 therethrough.

In addition, in this embodiment, a demultiplexer 340 intervenes between the protocol controller 20 and the IC cards 330, whereby the protocol controller 20 has a feature to control a maximum of six IC cards 330 through the use of the two ports A, B, that is, the two IC card control circuits 36A, 36B. Besides, in FIG. 11, the six IC cards 330 are represented with ICC0 to ICC5, respectively, with the ICC0 to ICC5 being respectively set in the actual card ports to which port numbers 0 to 5 are assigned (which will be referred hereinafter to as ports 0 to 5).

The demultiplexer 340 functions as a data transfer control unit (card switch) to establish proper connections between the six IC cards 330 and the IC card control circuits 36A, 36B (ports A, B) of the protocol controller 20 for the data transfer therebetween, that is, to selectively switch the two IC cards 330 to be accessed by the protocol controller 20 and the ports A, B to make connections therebetween.

Figure 29:
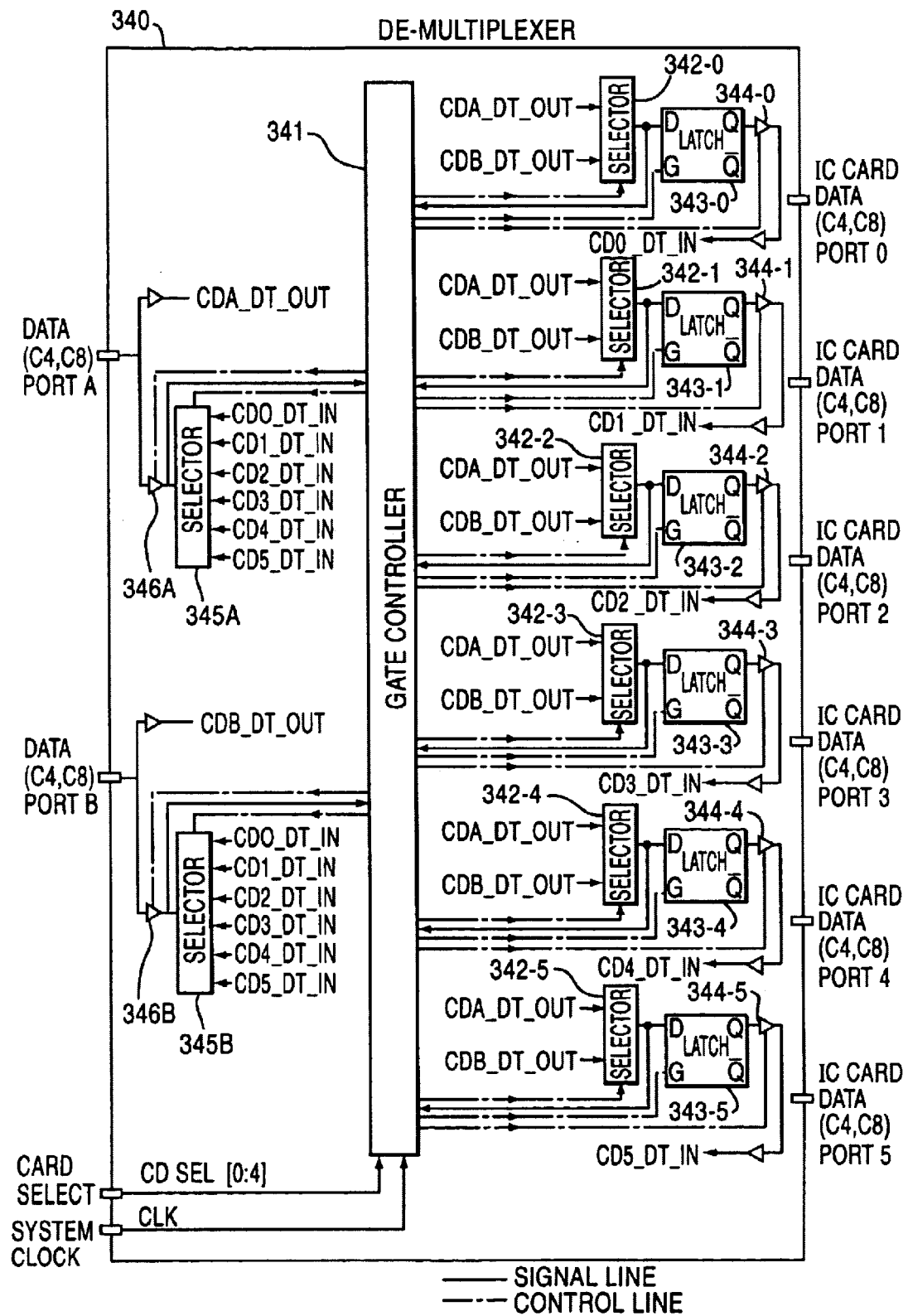
FIGS. 29 to 31 are block diagrams each showing a configuration of a demultiplexer (data transfer control unit) provided between the protocol controller and an IC card, in this embodiment.
Figure 30:
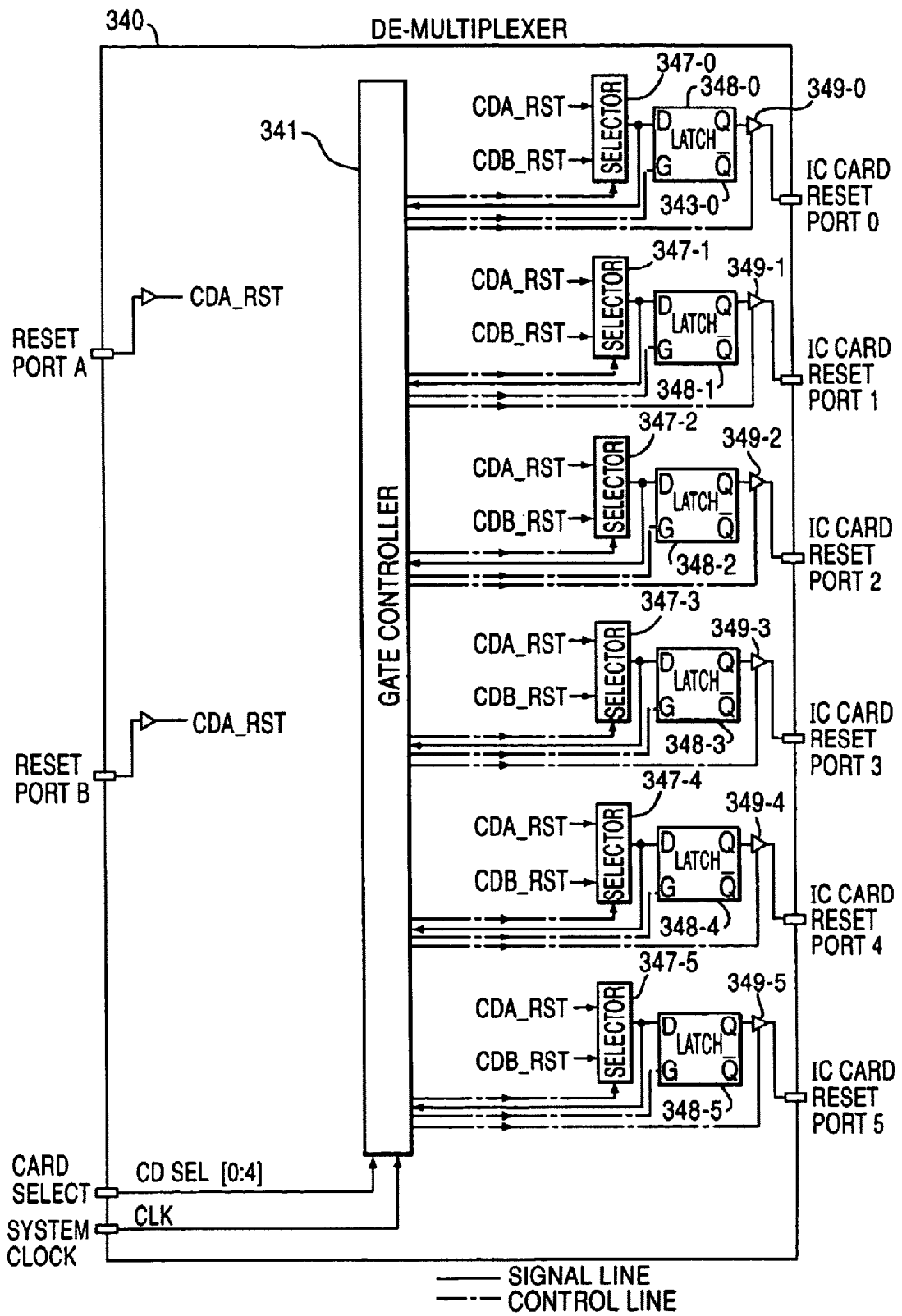

In addition, the demultiplexer 340 includes latch circuits 343-0 to 343-5 and 348-0 to 348-5 for latching the states of signals (data, C4/C8 signals, reset signals) to the IC cards 330 (non-accessed objects), which are not to be accessed, in the protocol controller 20 (see FIGS. 29 and 30).

Incidentally, a detailed and concrete configuration of the demultiplexer 340 will be described herein later with reference to FIGS. 29 to 31.

Moreover, the protocol controller 20 is provided with a card selector 43 which is for supplying the demultiplexer 340 with a select signal which selects and specifies the IC card 330 to be connected to each of the ports A, B as an object to be accessed, for accomplishing the switching operation of the demultiplexer 340. The IC cards 330, which are not selected by the select signals from the card selector 43, are treated as non-accessed objects, and the states of signals to the non-accessed IC cards 330 are made to be latched in the latch circuits 343-0 to 343-5 and 348-0 to 348-5 immediately before the transition to the non-accessed situations.

Besides, the card selector 43 is made to set a select signal through the use of an IC card port allocation register (see FIG. 33), and to output that select signal to the demultiplexer 340. The details of the select signal will be described herein later with reference to FIGS. 33 and 34. Further, the concrete switching operation of the demultiplexer 340 to be caused by the select signal will be described herein later with reference to FIGS. 35 and 36.

Each of card clock generators 38 is for generating a clock signal (control clock) to be supplied through a clock signal line 350 to each of a maximum of six IC cards 330 connectable to the protocol controller 20 according to this embodiment, with the number thereof being equal to the maximum number (that is, 6) of IC cards 330 to be put into connection.

In this way, according to this embodiment, the clock signals to be used for the respective IC cards 330 are fed through the clock signal lines 350, whose number is the same as the number of IC cards 330 (that is, it assumes 6), to the IC cards 330, while the six IC cards 330 share, through the demultiplexer 340, the data transfer signal lines (the data line, the C4 signal line, the C8 signal line, the reset signal line, and others) installed in the two ports A, B of the protocol controller 20.

Furthermore, in this embodiment, the power supply to the respective IC cards 330 is effected through the use of a voltage selector 360 and a power regulator 370. In this case, the power regulator 370 is designed to generate and output two kinds of voltages: 3V and 5V, while the voltage selector 360 chooses one of 3V and 5V in accordance with an instruction from the demultiplexer 340 and supplies the chosen one to each of the IC cards 330. A detailed configuration of the power supply system including this voltage selector 360 will be described herein later with reference to FIG. 32.

Additionally, the protocol controller 20 includes two card power control circuits 42 each for generating a designating signal of the voltage 3V/5V to be supplied to the IC cards 330 and for outputting it to the demultiplexer 340. The signal from each of the card power control circuits 42 is sent via the demultiplexer 340 to the voltage selector 360 which in turn, performs the voltage switching operation in accordance with that signal. In addition, if the failure of the power supply to each of the IC cards 330 occurs for some reason, the voltage selector 360 is to inform the card power control circuits 42 of that fact (power fail).

Besides, although not illustrated in FIG. 11, IC card mounting notice lines are laid between the ports A, B of the protocol controller 20 and the ports 0 to 5 for the IC cards 330. As will be described herein later with reference to FIG. 31, the information representative of whether or not each of the IC cards (ICC0 to ICC5) 330 is mounted in each of the ports 0 to 5 goes through the corresponding IC card mounting notice line and the demultiplexer 340 to the IC card control circuits 36A, 36B.

The above-mentioned peripheral control circuits 26, 27, 29, 31 to 35, 36A, 36B, 38, 42 and 43 are not always connected to the above-described various devices, designated at the reference numerals 51 to 54, 56 and 59 to 64, for controlling these devices, but are previously incorporated into the protocol controller 20 to control these devices when needed. This contributes to the realization of an extremely high flexibility of the protocol controller 20 according to this embodiment.

[1-1] Description of Method for Identification of Exterior Type ROM Connection

Secondly, referring to FIG. 12, a description will be made hereinbelow of a method of identifying or checking whether or not the exterior type ROM (external ROM) 54*a* functioning as a program storing external storage section is in connection with the protocol controller 20 according to this embodiment. Incidentally, FIG. 12 illustrates an address space in the protocol controller 20 according to this embodiment.

According to this embodiment, the CPU 21 in the protocol controller 20 fulfills an identification means to judge whether or not the exterior type ROM 54*a* is connected through the interface circuit 3 to the protocol controller 20. If this identification means judges that the exterior ROM 54*a* is in connection, the CPU 21 reads out a program (for example, OS) stored in this exterior type ROM 54*a* and starts it.

Figure 12:
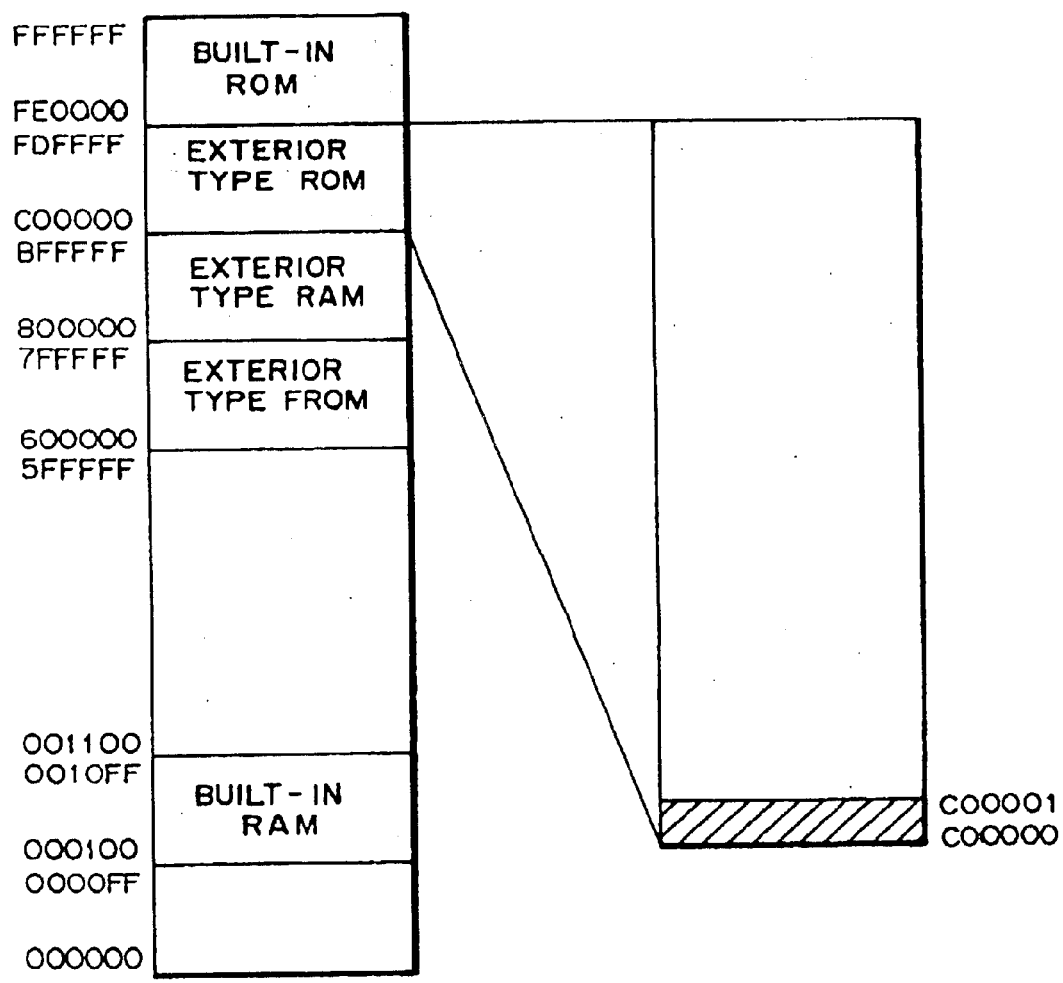
FIG. 12 shows a configuration of an address space in a protocol controller according to this embodiment, for explaining a discrimination method for an exterior type ROM (external ROM) according to this embodiment.

In this embodiment, for example, as shown in FIG. 12, the address space is allocated to the built-in ROM 22, the built-in RAM 23, the exterior type ROM 54*a*, the exterior type RAM 54*b* and the exterior type FROM 54*c*. In the protocol controller 20 according to this embodiment, for example, addresses C00000 to EDFFFF are allocated to the exterior type ROM 54*a*.

In this case, 0x0000 is previously stored in the leading two bytes (a shaded portion in FIG. 12: addresses C00000 to C00001) of the exterior ROM 54*a* while, in the protocol controller 20, all the data signal lines of the data bus 25 to be connected to the exterior type ROM 54*a* are connected through a pull-up resistor to a high electric potential.

With this configuration, if only reading out the data at the logical addresses C00000 to C00001, the CPU 21 can identify the presence or absence of the exterior type ROM 54*a*. That is, in the case of the exterior ROM 54*a* being in connection, the CPU 21 reads out the data 0x0000 from the exterior type ROM 54*a* through the data bus 25. Conversely, in the case that no connection of the exterior type ROM 54*a* takes place, since all the data signal lines of the data bus 25 are pulled up, the CPU 21 performs the operation equivalent to reading out the data 0xfffff.

Thus, in this embodiment, the CPU 21 can identify the connection/non-connection of the exterior type ROM 54*a* by judging whether the value obtained as the readout result from the logical addresses C00000 to C00001 is 0x0000 or 0xfffff.

[1-2] Description of Control Program Structure

Furthermore, referring to FIG. 13, a description will be given hereinbelow of a control program structure in the protocol controller 20 according to this embodiment.

As shown in FIG. 13, the control program 5A to be stored in the ROM 22 is composed of a boot program (BOOT) 520, an OS (operating system) 521, an application program 522, a first digital money protocol control program 523-1, a second digital money protocol control program 523-2 and a group of device control programs 530.

The BOOT 520 is made to be initially put into activation for starting the control program 5A, and it starts the OS 521.

The device control program group 530 functions as a plurality of device control programs for controlling external circuits connected to the interface circuit 3 and the peripheral control circuits noted before with reference to FIG. 11, and usually a pair of handler and driver organize one device control program. In this embodiment, the above-mentioned handlers 531A to 536A and drivers 531B to 537B for use as the device control programs.

The first digital money protocol control program 523-1 and the second digital money protocol control program 523-2 are for controlling the programs pertaining to the device control program group 530 in correspondence to two kinds of digital money, respectively.

The application program 522 is for controlling the programs pertaining to the device control program group 530 and the two kinds of protocol control programs 523-1 and 523-2.

[1-3] Description of Control Telegraphic Statement

Figure 14:
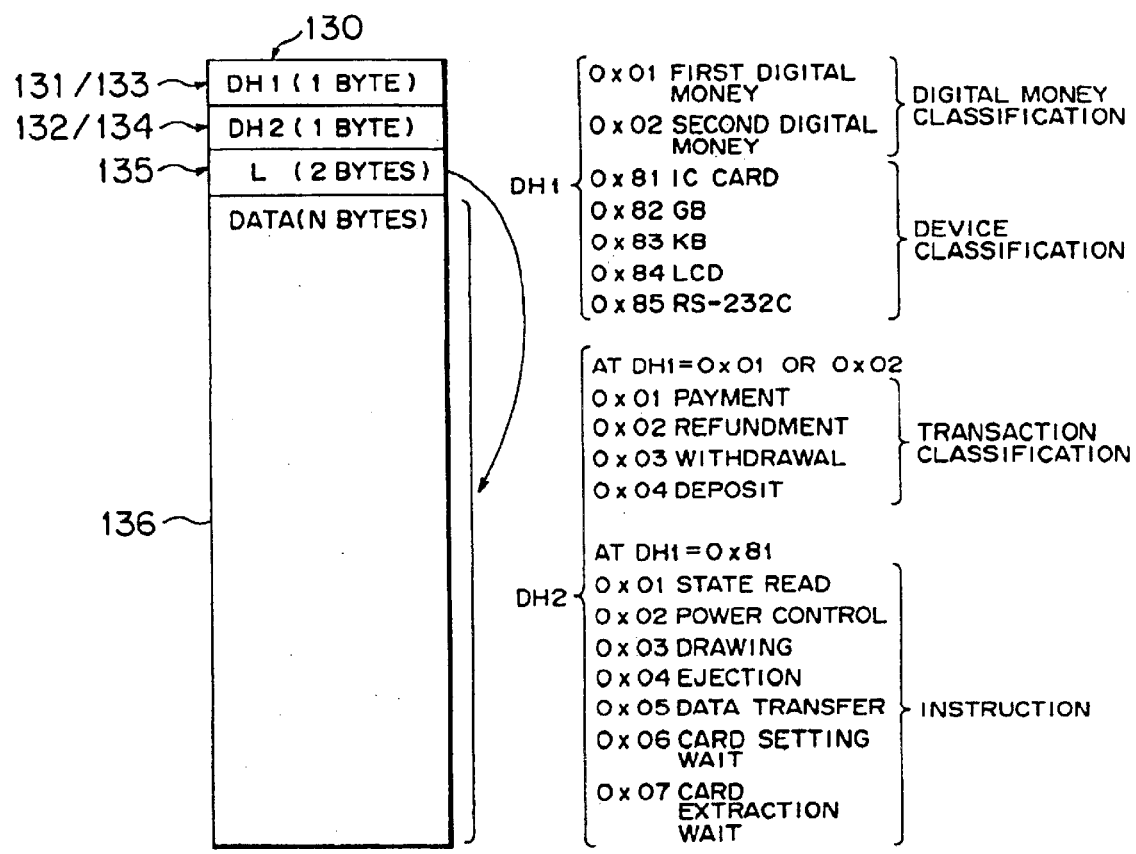
FIG. 14 is an illustration useful for explaining a configuration of a control telegraphic statement for use in the protocol controller according to this embodiment.

Referring to FIG. 14, a description will be taken hereinbelow of a configuration of a control telegraphic statement 130 for use in the protocol controller 20 according to this embodiment.

In the control program 5A in this embodiment, the application program 522 receives the control telegraphic statement 130, shown in FIG. 14, from an external unit, such as the host system 51 or the like, through the serial transmission/receive control circuit 26, and thereby controls the programs pertaining to the device control program group 530 and the two kinds of protocol control programs 523-1, 523-2 in accordance with the contents of that control telegraphic statement 130.

In this instance, as shown in FIG. 14, the control telegraphic statement 130 has an N-byte data field 136, and is for transferring data in a state of its being stored in the data field 136. To the data to be transferred, there are given a 1-byte data header DH1 and a 1-byte data header DH2 in addition to a data length field 135 denoting a length L of data stored in the data field 136 to be transferred.

In addition, in the case of the control telegraphic statement 130 in this embodiment, the data header DH1 is used as the digital money classification field 131 or the device classification field 133, while the data header DH2 is used as the transaction classification field 132 or the instruction field 134.

In this case, the specified data to be taken for when the data header DH1 is used as the digital money classification field 131 and the specified data to be taken for when it is used as the device classification field 133 assume values mutually exclusive of each other. When the data header DH1 is for use as the digital money classification field 131, the data header DH2 functions as the transaction classification field 132. Conversely, when the data header DH1 is for use as the device classification field 133, the data header DH2 acts as the instruction field 134.

More concretely, for example, as shown in FIG. 14, in the data header DH1, there are written 1-byte data "0x01", "0x02", "0x81", "0x82", "0x83", "0x84" and "0x85".

Of these 1-byte data, "0x01" and "0x02" are each for specifying a digital money classification, with "0x01" specifying the first digital money while "0x02" designating the second digital money. Accordingly, if "0x01" or "0x02" is written in the data header DH1, the data header DH1 functions as the digital money classification field 131.

In contrast with this, "0x81" to "0x85" specify an IC card, a GB (green button), a KB (keyboard), an LCD, an RS232C in the device classification, respectively; consequently, any one of "0x81" to "0x85" is written in the data header DH1, the data header DH2 has a feature as the device classification field 133.

Furthermore, in the case that "0x01" or "0x02" is written in the data header DH1, in the data header DH2, for example, there are written "0x01" to "0x04" which form 1-byte data for specifying the classification of the transaction to be done through the designated digital money. These data "0x01" to "0x04" accomplish the designation of transaction classifications, such as payment, refundment, withdrawal and deposit, respectively.

Still further, if any one of "0x81" to "0x85" is written in the data header DH1, then, in the data header DH2, for example, there are written "0x01" to "0x07" which produce 1-byte data for specifying instructions to the device designated. These data "0x01" to "0x07" accomplish the designation of instructions, such as state read, power control, drawing, ejection, data transfer, card setting wait and card extraction wait, respectively.

The application program 522, when the data header DH1 and the data header DH2 in the control telegraphic statement 130 it has received are respectively used as the digital money classification field 131 and the transaction classification field 132, makes the protocol control program 523-1 or 523-2 for the digital money specified by the digital money classification field 131 carry out the transaction designated by the transaction classification field 132.

On the other hand, when the data header DH1 and the data header DH2 in the control telegraphic statement 130 received are respectively used as the device classification field 133 and the instruction field 134, the application program 522 communicates the instruction described in the instruction field 134 to the device control program (a pair of handler/driver in the device control program group 530), which is for controlling the device specified by the device classification field 133, and makes it execute this instruction, while transmitting a response to the instruction from the device control program as a response telegraphic statement to the instruction issuer (that is, the issuer of the control telegraphic statement 130; for example, the host system 51) through the serial transmission/receive control circuit 26.

[1-4] Description of Another Structure of Control Program

Referring to FIG. 15, a description will be made hereinbelow of another example of control program structure in the protocol controller 20 according to this embodiment.

As shown in FIG. 15, the control program 5B to be put in the ROM 22 is based upon the addition of a device router (path control program) 540 and a table 550 to the control program 5A described above with reference to FIG. 13. In FIG. 15, the same numerals as those used above depict the same or substantially same parts, and the description thereof will be omitted for brevity.

In the following description, the programs pertaining to the device control program group 530, the application program 522 and the protocol control programs 523-1, 523-2 will sometimes be referred to as modules.

The device router (path control program) 540 is for providing a feature capable of establishing interconnections between the aforesaid modules. In the case of the use of the control program 5B to be described here, a peculiar module identifier is given to each of the modules in advance, and the device router 540 makes interconnections between the modules by using the module identifier of the connection-requesting module and the module identifier of the connection-accepting module as parameters, and produces the interchange of the control telegraphic statement 130, mentioned above, between these modules.

At this time, if the connection-accepting module belongs to an external unit (for example, the host system 51 or the like) connected through communication ports P0 to P2 of the protocol controller 20, the device router 540 makes the HOST procedure handler 532A or the RS232C drivers 531B/532B, 537B, serving as the communication control programs, control the serial transmission/receive control circuit 26, thereby making a connection between the connection-requesting module in the protocol controller 20 and the connection-accepting module in the external unit.

Figures 16A, 16B, 17:
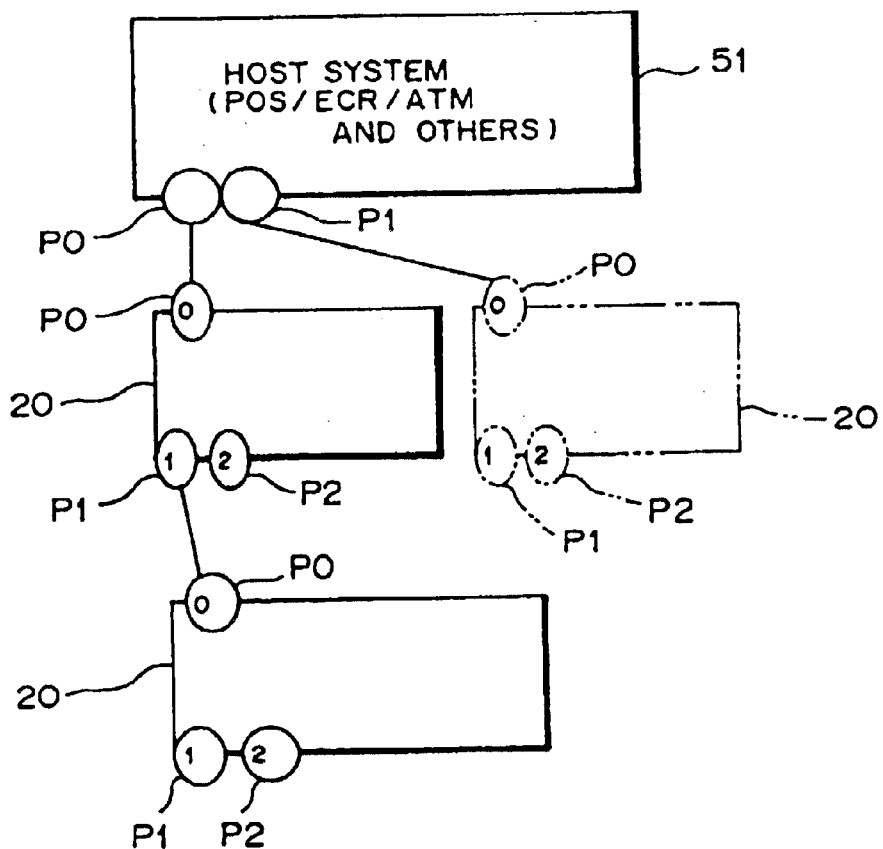
FIGS. 16A and 16B are illustrations each for describing the contents of a table retaining a correspondence between a module identifier and a path identifier in this embodiment.
FIG. 17 is an illustration of an example of cascade connection in the protocol controller according to this embodiment.

In this instance, it is also appropriate that, as shown in FIG. 17, the external unit to be connected to the protocol controller 20 to develop into the object of communication is a processing unit (for example, a personal computer) having the same ability as that of the protocol controller 20 according to this embodiment, or that it is another protocol controller 20 having the same configuration (ability) as that of the protocol controller 20 according to this embodiment, which is incorporated into a transaction apparatus.

Furthermore, in the case that, as shown in FIG. 17, a plurality of protocol controllers 20 are connected in a cascade fashion from the host system 51, such as POS/ECR/ATM, through the use of the three communication ports P0 to P2 of the protocol controller 20, the interface function of the device router 540 also permits the intercommunications among these protocol controllers 20 and host system 51.

If the protocol controller 20 is to be communicably connected to an external unit (a processing unit or another protocol controller 20) having a module, a peculiar module identifier is assigned to even the module pertaining to the external unit and capable of being an object of communication, while the protocol controllers 20 and the external units are also provided with a device router 540 and a peculiar path identifier (which enables the identification of the connection-accepting module) is given thereto in advance. In this case, the device router 540 sets up interconnections between the modules by using, as the parameters, the module identifier of the connection-requesting module, the module identifier of the connection-accepting module and the path identifier of the unit to which the connection-accepting module pertains.

In this embodiment, in order to make the interconnections between the modules through the use of the module identifiers and the path identifier as mentioned above, the control program 5B contains the table 550 retaining the correspondence between each of the module identifiers and each of the path identifiers indicative of the units to which the module-identifier given modules pertain. The contents of this table 550 depend upon the configuration of hardware (system) to be built in the protocol controller 20. In this system, a table 550 having the same contents is placed in all the units (protocol controllers 20 or processing units) interconnected communicably and equipped with a built-in device router 540.

The concrete contents of this table 550 are shown in FIGS. 16A and 16B.

In the case that a plurality of protocol controllers are cascade-connected as shown in FIG. 17, a correspondence among the path identifier of each of the protocol controllers, the path identifier of the host protocol controller connected to that protocol controller, and the communication port number (the definition of the protocol controller arrangement) is retain in the table 550 as shown in FIG. 16A.

The contents of the table 550 as shown in FIG. 16A signify the following arrangement. That is, the protocol controller having the path identifier #90 forms a root (ROOT), while the protocol controller with the path identifier #01 is connected to the port #1 in the protocol controller with the path identifier #90, the protocol controller with the path identifier #02 is connected to the port #1 in the protocol controller with the path identifier #01, the protocol controller with the path identifier #03 is connected to the port #2 in the protocol controller with the path identifier #01, the protocol controller with the path identifier #04 is connected to the port #1 in the protocol controller with the path identifier #02, and the protocol controller with the path identifier #05 is connected to the port #2 in the protocol controller with the path identifier #02.

In addition, as shown in FIG. 16B, a correspondence between a module identifier given to each of all modules a plurality of protocol controllers include, and the path identifier of the protocol controller, to which that module pertains, [the definition of module identifiers (device numbers)] is retained together with its module name (or a name of a device controlled by the module) in the table 550.

As seen from the contents of the table 550 as shown in FIG. 16B, the module with the module identifier #01 pertains to the protocol controller with the path identifier #01, the module (device name: ICCRW01) with the module identifier #02 pertains to the protocol controller with the path identifier #02, the module (device name: ICCRW02) with the module identifier #03 belongs to the protocol controller with the path identifier #02, the module (device name: LCD) with the module identifier #20 belongs to the protocol controller with the path identifier #01, and the module (device name: KEY) with the module identifier #21 belongs to the protocol controller with the path identifier #01.

Such contents (the aforesaid correspondence) residing in the table 550 can be set/altered by the CPU 21 on the basis of a telegraphic statement the serial transmission/receive control circuit 26 receives. Further, it is also possible that the table 550 is stored in the external memory 54 connected through the interface circuit 3, in place of being put in the control program 5B.

In this embodiment, the device router 540, when making a connection between the modules, retrieves the contents of the table 550 (in this case, the contents shown in FIG. 16B) in relation to the module identifier of the connection-accepting module for obtaining the path identifier corresponding to the module identifier of the connection-accepting module.

If the path identifier obtained through the retrieval coincides with its own path identifier, because this means that the connection-requesting module and the connection-accepting module pertain to the same protocol controller 20, the device router 540 sets up the interconnection between these modules in the protocol controller 20. Conversely, if the path identifier obtained through the retrieval does not coincide with its own path identifier, the device router 540 judges that the connection-accepting module belongs to a different protocol controller, and, hence, retrieves the contents of the table 550 (in this case, the contents shown in FIG. 16A) in relation to that path identifier for first recognizing the connection status of the different protocol controller, and then controls the serial transmission/receive control circuit 26 through the use of the HOST procedure handler 532A and the RS232C drivers 531B/532B, 537B, thereby establishing the connection between the connection-requesting module in the protocol controller 20 and the connection-accepting module in the different protocol controller.

Besides, if processing units (a), (b) of a personal computer or the like, having the following configurations, are connected as external units to the protocol controller 20 according to this embodiment, communications are possible between these processing units (a), (b) and the protocol controller 20.

The processing unit (a) is made up of a CPU, a memory for storing a control program 5B similar to that mentioned before, and a communication control circuit for controlling communications with an external unit (in this case, a protocol controller 20), with this control program 5B being composed of at least a communication control program for the communication control circuit (comprising equivalents to the HOST procedure handler 532A and the RS232C drivers 531B/532B, 537B noted above), a path control program with a peculiar path identifier (an equivalent to the device router 540 noted above), and modules with peculiar module identifiers (an application program, a protocol control program, device control programs, and others). Where such a processing unit (a) is connected to a protocol controller 20, the communications between the processing unit (a) and the protocol controller 20 is completely the same as the interconnections between two protocol controllers 20.

The processing unit (b) is made up of a CPU, a memory for storing a program 5, and a communication control circuit for controlling communications with an external unit (in this case, a protocol controller 20), with this memory storing at least a communication control program for controlling the communication control circuit and an application program capable of issuing requests for connections to various types of modules within the protocol controller 20, being in connection with the communication control circuit, to the device router 540 in the protocol controller 20. Where such a processing unit (b) is connected to a protocol controller 20, when receiving a connection request from the processing unit (b), the device router 540 of the protocol controller 20 makes a connection between the corresponding module in the protocol controller 20 and the processing unit (b).

[1-5] Description of Example of Transaction Processing by Protocol Controller

Referring to FIGS. 18 and 19, a description will be made hereinbelow of an example of transaction processing using the protocol controller 20 according to this embodiment.

In the example as shown in FIG. 18, a digital money (IC card) handling unit 70, forming a transaction apparatus, internally includes the protocol controller 20, and is equipped with a protocol controller application for controlling this protocol controller 20, and an upper (host) application to be run by a host processing section (CPU) 72 to control this protocol controller application.

In a state where two IC cards (portable type mediums) 330-1, 330-2 are connected to the protocol controller 20, if the host processing section 72 makes a request for digital money transfer from one IC card 330-1 to the other IC card 330-2 to the protocol controller 20 (see an arrow indicated by the circled numeral 1), the protocol controller 20 conducts the actual digital money transfer processing (see an arrow indicated by the circled numeral 2), with the processing result being given from the protocol controller 20 to the host processing section 72 (see an arrow indicated by the circled numeral 3).

That is, the host processing section 72 (upper application) can handle a plurality of kinds of digital money different in mode from each other in a manner of only issuing a request for a transaction on digital money without paying attention to the digital money protocol depending on the mode.

In an example as shown in FIG. 19, two digital money handling units 70, each identical to that described above, are provided to assume a system in which these units 70, 70 are connected to each other to be mutually communicable through a network 71, where digital money transfer between IC cards 330-1, 330-2 takes place with the IC cards 330-1, 330-2 being connected to protocol controllers 20, 20 of these two units 70, 70, respectively.

In this instance, an intercommunication path is first established between host processing sections 72, 72 in the two units 70, 70 (see arrows indicated by the circled numeral 1), and then the host processing section 72 of one unit 70 makes a request for digital money transfer from one IC card 330-1 to the other IC card 330-2 to the protocol controller 20 of the one unit 70 (see an arrow indicated by the circled numeral 2). In response to this request, the actual digital money transfer processing is effected through the intercommunication path on the network 71 between the two protocol controllers 20, 20 (see arrows indicated by the circled numeral 3). Following this, the protocol controller 20 of the one unit 70 informs the host processing unit 72 of that processing result (see an arrow indicated by the circled numeral 4), and the intercommunication path is finally cut off (see arrows indicated by the circled numeral 5).

That is, also in this example, the host processing sections 72, 72 of the two units 70, 70 can handle a plurality of kinds of digital money different in mode from each other, through the network 71 in a manner of only issuing a request for a transaction on digital money without paying attention to the digital money protocol depending on the mode.

[1-6] Description of Example of Concrete Application of Protocol Controller

Figure 20:
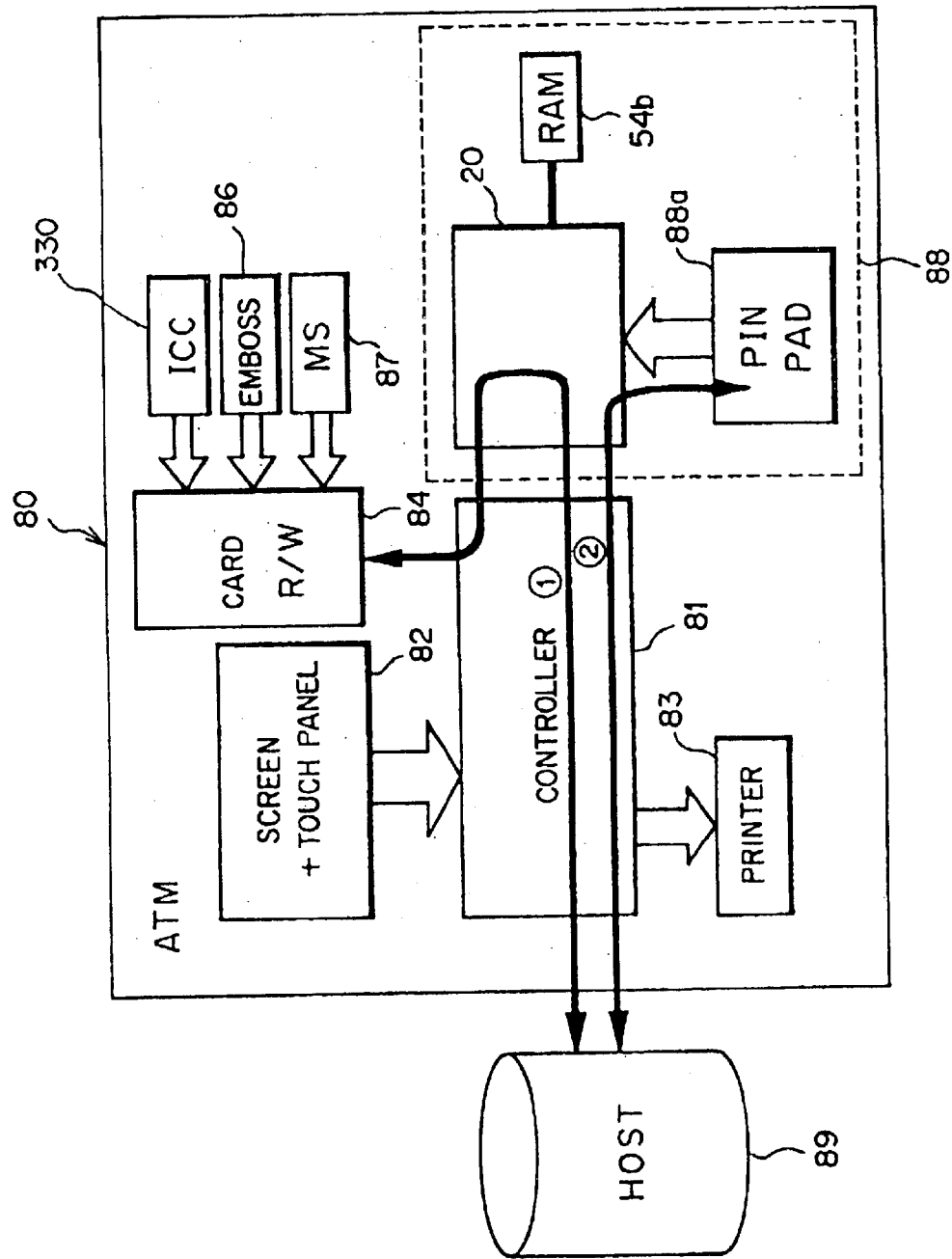
FIG. 20 is a block diagram showing an example of configuration of an ATM to which applied is the protocol controller according to this embodiment.
Figure 21:
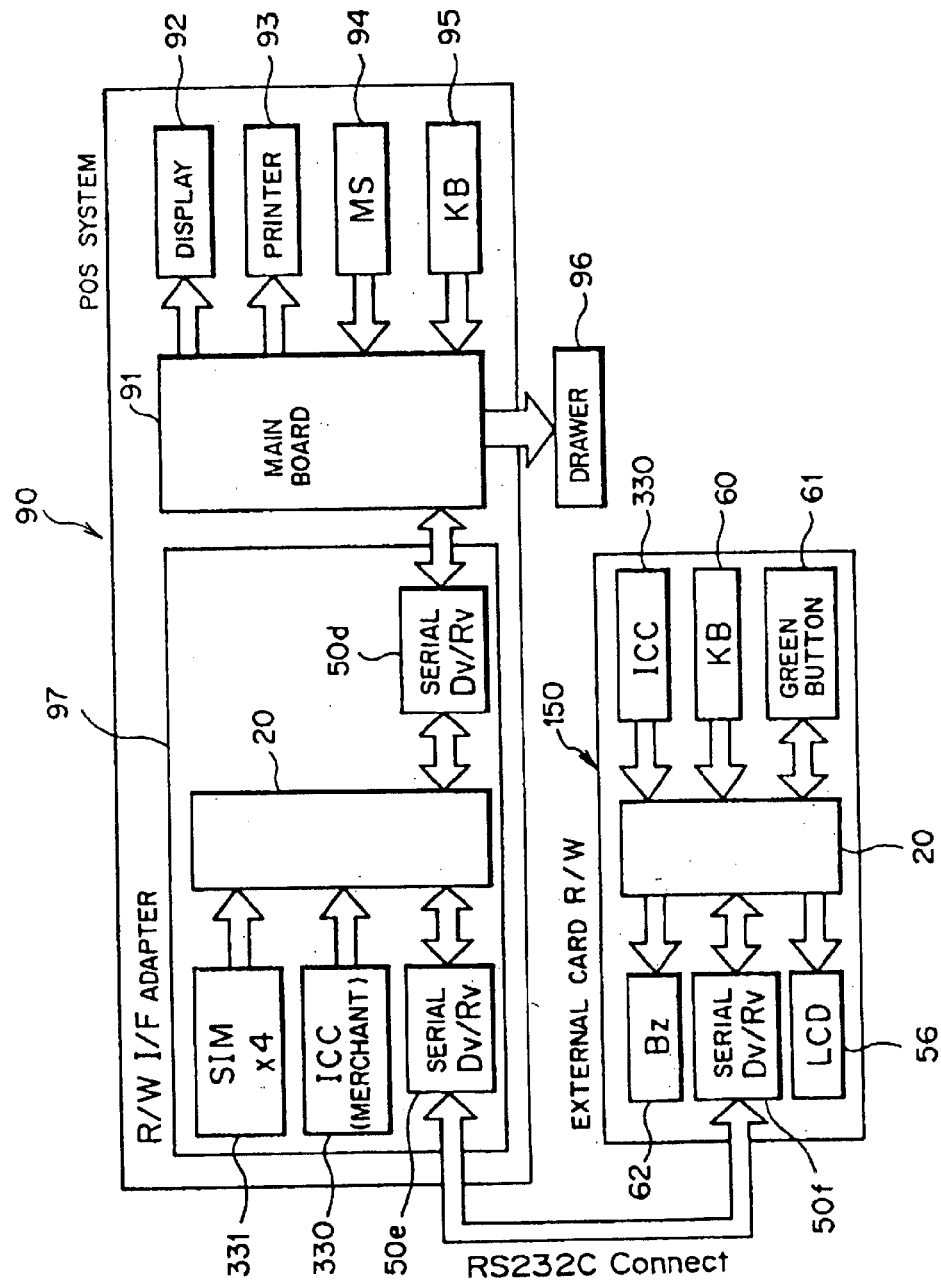
FIG. 21 is a block diagram showing examples of a POS system, to which applied is the protocol controller according to this embodiment, and an external card reader/writer.
Figure 22:
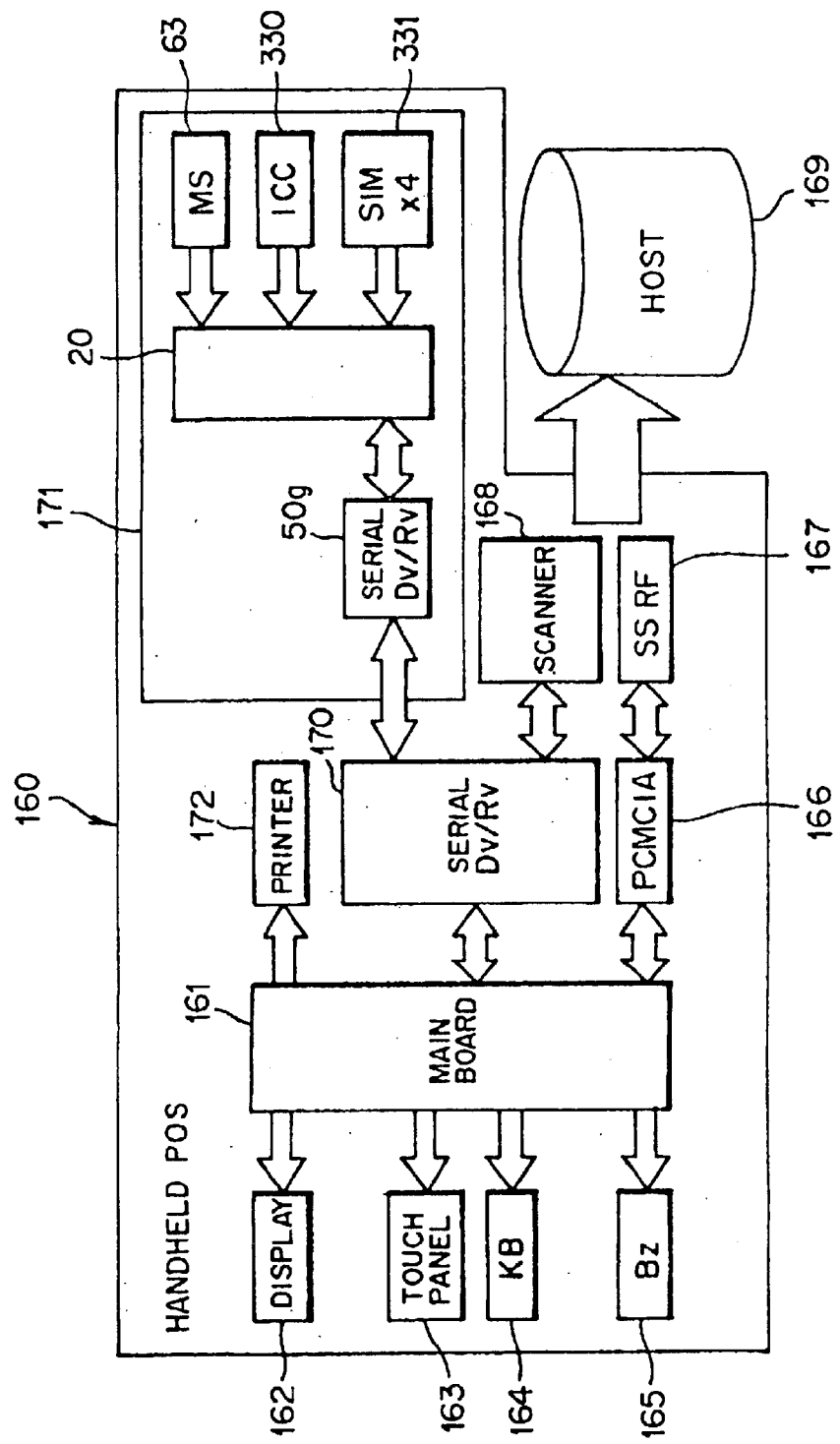
FIG. 22 is a block diagram showing an example of configuration of a hand-held POS terminal to which applied is the protocol controller according to this embodiment.

Referring to FIGS. 20 to 22, a description will be given hereinbelow of an example of concrete application of the protocol controller 20 according to this embodiment (example of incorporation into various types of transaction apparatus).

FIG. 20 is a block diagram showing an example of configuration of an ATM (Automatic Teller Machine) 80 into which incorporated is the protocol controller 20 according to this embodiment. As shown in FIG. 20, the ATM 80 is made up of a control circuit (controller) 81, a screen/touch panel (Screen+Touch Panel) 82, a printer 83, a card reader/writer (Card R/W) 84 and a protocol controller block 88, and is connected to a host 89.

Furthermore, the protocol controller block 88 contains the protocol controller 20 according to this embodiment, while this protocol controller 20 is connected to an exterior type RAM 54b, and further connected to a PIN pad 88a, which is for inputting PINs (Personal Identification Numbers), in the form of a device.

In this instance, the control circuit 81 is for controlling the printer 83, the card reader/writer 84 and the protocol controller 20 in accordance with a signal from the host 89 or the screen/touch panel 82, or the like. Further, the card reader/writer 84 gains the write/readout access to an IC card 330, and further has a function to read out an emboss section 86 made on the IC card 330 and magnetic information in a magnetic stripe portion (MS) 87 on the IC card 330.

Such an ATM 80 has various and diverse features, and is for handling extremely complicated IC cards 330 or the like, but all the features are impossible to achieve by the protocol controller 20. For this reason, the ATM 80 makes use of the functions of the protocol controller 20 in conducting the processing related to a protocol for each kind of digital money (see arrows indicated by the circled numeral 1) or the processing concerning the cryptography of PIN (see arrows indicated by the circled numeral 2), whereas the control circuit 81 is made to conduct all the I/O control (for example, handling of the IC card 330, input of an mount of money, screen display, printing-out, and others) other than these processing.

For instance, although the actual I/O control to the card reader/writer 84 is done by the control circuit 81, as mentioned above, the control circuit 81 asks the protocol controller 20 to conduct, of the I/O control, the processing of a portion pertaining to the digital money protocol as shown by the arrows with the circled numeral 1, whereupon this protocol controller 20 conducts it through the use of a protocol control program for the mode of the kind of digital money to be processed.

Furthermore, there is a case in which there is a need to encrypt the PIN, depending upon the digital money protocol. If handling such digital money, the control circuit 81 makes the protocol controller 20 run the cryptography of the PIN inputted from the PIN pad 88a or the decryptment of the PIN encrypted as shown by the arrows with the circled numeral 2.

Thus, when the control circuit 81 conducts the processing through the use of the protocol controller 20, an operation request function by the foregoing control telegraphic statement 130 and a path control function by the device router 540 are effectively feasible.

FIG. 21 is a block diagram showing configurations of a POS system 90 incorporating the protocol controller 20 according to this embodiment, and an external card reader/writer 150. As shown in FIG. 21, the POS system 90 is made up of a main board 91, a display 92, a printer 93, an MS reader 94, a keyboard (KB) 95, a drawer 96 and a reader/writer interface adapter (R/W I/F Adapter) 97, and is connected to the external card reader/writer 150.

The reader/writer interface adapter 97 of the POS system 90 involves the protocol controller 20 according to this embodiment, while this protocol controller 20 is connected through serial driver/receiver 50d and 50e to the main board 91 and to the external card reader/writer 150, and further connected through a demultiplexer 340 (omitted from the illustration in FIG. 21) to four SIMs (Subscriber Identity Modules) 331 and to an IC card 330 functioning as a merchant card. In this case, the main board 91 receives a signal from the MS reader 94 or the keyboard (KB) 95 to control the operations of the display 92, the printer 93 and the drawer 96.

The external card reader/writer 150 involves the protocol controller 20 according to this embodiment, while this protocol controller 20 is connected through a serial driver/receiver 50f to the POS system 90, and further connected to an LCD 56, a keyboard 60, a green button 61, a buzzer (Bz) 62 and an IC card 330 each of which forms a device.

The POS system 90 is employed, for example, as a register in stores, and is connected to the aforesaid external card reader/writer 150, so that, when a customer performs a payment by digital money, the IC card 330 is mounted in the external card reader/writer 150 and the keyboard 60 or the green button 61 is manipulated by reference to the indication on the LCD 56, thereby accomplishing the payment of a predetermined amount of money. At this time, the two protocol controllers 20, 20 are cascade-connected under the main board 91 so that the digital money transfer processing between the IC card (merchant card) 330 on the POS system 90 side and the customer's IC card 330 in the external card reader/writer 150 takes place through these protocol controllers 20, 20.

FIG. 22 is a block diagram showing an example of configuration of a hand-held POS terminal (handy POS) 160 incorporating the protocol controller 20 according to this embodiment. As shown in FIG. 22, the hand-held POS terminal 160 is composed of a main board 161, a display 162, a touch panel 163, a keyboard (KB) 164, a buzzer (Bz)

164, a printer 172, a PC card interface (PCMCIA) 166, a radiocommunication section (SSRF) 167, a scanner 168, a serial driver/receiver 170, and a protocol controller block 171.

Furthermore, the protocol controller block 171 is provided with the protocol controller 20 according to this embodiment, where the main board 161 is connected through the serial driver/receiver 170 and a serial driver/receiver 50g to this protocol controller 20, and an MS reader 63, an IC card 330 and four SIMs 331 are further connected thereto.

In this instance, the main board 161 is connected through the serial driver/receiver 170 to the scanner 168, while it is additionally connected through the PC card interface (PCMCIA) 166 and the radiocommunication section (SSRF) 167 to a host 169. Moreover, the main board 161 receives signals from the touch panel 163 and the keyboard 164 to control the operations of the buzzer (Bz) 165 and the printer 172.

The hand-held POS terminal 160 is used for when a customer, making a payment, renders a settlement while, if in a restaurant or the like, remaining seated without leaving for a register (POS terminal). When rendering a payment by digital money, the touch panel 163 or the keyboard 164 is manipulated in a state where a customer's IC card 330 is set in the hand-held PCS terminal 160, thereby accomplishing the necessary settlement. The information about the settlement (an amount of money paid, and others) is communicated from the host 169 to the hand-held POS terminal 160 by means of radio transmission, while the information about the digital money drawn out from the IC card 330 is radio-transmitted from the hand-held POS terminal 160 to the host 169. In this way, the protocol controller 20 in the hand-held POS terminal 160 is employed for when digital money is drawn out from the IC card 330 for settlement.

[1-7] Description of Cipher Key

In the protocol controller 20 according to this embodiment, since the ROM 22 is constructed as a mask ROM as mentioned before, it is also appropriate that a plurality of cipher keys or a set of cipher keys are stored in this ROM 22 in advance so that one key is selected from these cipher keys or set of cipher keys to be used together with the control program 5A or 5B.

In this case, the protocol controller 20 is internally designed such that one of the plurality of cipher keys or one of the cipher key set is specified by a telegraphic statement received from the external through the serial transmission/receive control circuit 26. Further, it is also acceptable that one of the plurality of cipher keys or one of the cipher key set is specified through the use of an external storage section (for example, the exterior type ROM 54a) connected through an interface circuit.

In such a manner that a plurality of cipher keys or a set of cipher keys are previously stored in the ROM 22 in the protocol controller 20 to be selectively switched from the exterior of the protocol controller 20, it is possible to deal with a plurality of cipher keys or a set of cipher keys while ensuring the security of the cipher keys.

[1-8] Description of Effects Attainable by Protocol Controller According to this Embodiment As described above, with the protocol controller 20 forming an embodiment of this invention, one protocol controller 20 can handle a plurality of kinds of digital money different in mode from each other, and it can be used in common among various types of transaction apparatus (for example, the ATM 80, the POS system 90, the external card reader/writer 150, and the hand-held POS terminal 160, mentioned before). At this time, if various types of peripheral control circuits are contained (integrated) in the protocol controller 20, a portion common to the various types of transaction apparatus is enlargeable.

In addition, in the protocol controller 20, since the ROM 22 for storing the control program 5A or 5B is constructed as a mask ROM, it is possible to inhibit the access to the control program 5A or 5B from the exterior of the protocol controller 20 coupled with ensuring the security. Additionally, the possible connection of the exterior type ROM 54a, which is to serve as a program storing external storage section, to the protocol controller 20 enhances the extendibility of the protocol controller 20.

Furthermore, the use of the control telegraphic statement 130 enables the designation of the classification (protocol control program) of digital money to be used from the exterior of the protocol controller 20, and further enables the direct control of the various types of peripheral control circuits, incorporated into the protocol controller 20, from the outside, which allows the execution of processing (for example, using an IC card reader/writer irrespective of the processing on the digital money) other than the processing on various kinds of digital money.

Still further, a protocol controller 20 can singly be incorporated into a transaction apparatus and others, and, as shown in FIG. 17, a protocol controller 20 can be connected to the host system 51 or a plurality of protocol controllers 20 can be cascade-connected to the host system 51, which permits the construction of an extremely flexible system using the protocol controller 20.

As described above, the protocol controller 20 according to this embodiment exhibits extremely high versatility and, hence, can be used in common among various types of digital money handling transaction apparatus. Thus, if an approval is gained in terms of the protocol controller 20, an approval is needed only for unique portions of apparatus other than the protocol controller 20, and the need for the approval at every digital money taking a different mode is eliminable. Accordingly, it is possible to sharply reduce the number of man-hours for the design and development of each of various types of transaction apparatus, and further to considerably reduce the number of man-hours for the approval (man-hour for the verification for an approval) in an organization or the like, and even to realize improvement of reliability concurrently with a high security performance.

[2] Description of Device Connection State Recognizing Method for use in Protocol Controller According to this Embodiment Referring to FIGS. 23 to 28, a description will be made hereinbelow of a device connection state recognizing method to be applied to the protocol controller 20 according to this embodiment.

As described before with reference to FIG. 12, the CPU 21 of the protocol controller 20 according to this embodiment is equipped with an identification means to check whether or not the exterior type ROM 54a is connection with this protocol controller 20, whereas it is also appropriate that a device connection state recognizing function, which will be described hereinbelow, is employed in place of this identification means. The employment of this device connection state recognizing function enables the recognition of connection/non-connection (connection state) of various types of devices other than the exterior type ROM 54a.

Figure 23:
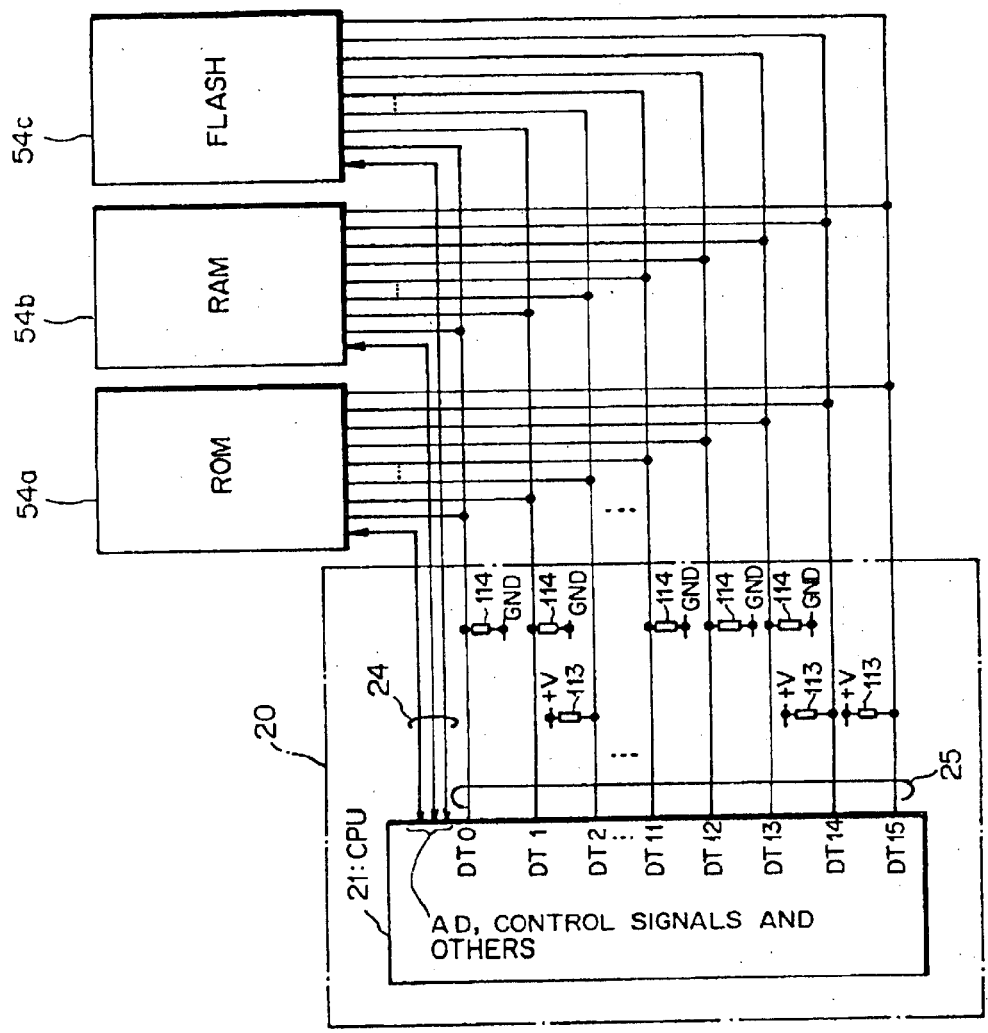
FIGS. 23 and 24 are illustrations of circuits, each for describing a device connection state recognizing method in the protocol controller according to this embodiment.
Figure 24:
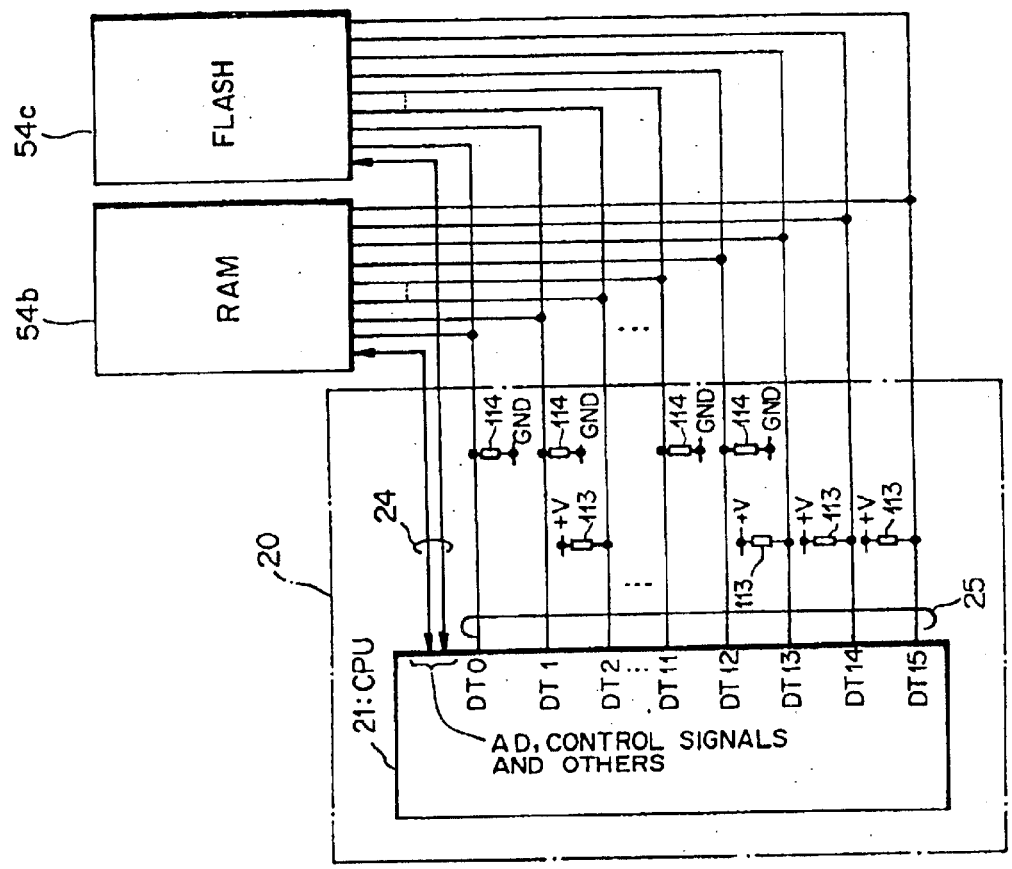

In FIGS. 23 and 24, a CPU 21, an address bus 24 and a data bus 25 in the protocol controller 20 are illustrated in a state of being extracted, whereas circuits and others producing other components are omitted from the illustration. FIG.

23 shows a circuit arrangement of the protocol controller 20 to which the exterior ROM 54a, the external type RAM 54b and the FROM (FLASH) 54c are connected as devices, while FIG. 24 shows a circuit arrangement of the protocol controller 20 to which the external type RAM 54b and the FROM (FLASH) 54c are connected as devices. Incidentally, in this embodiment, the data bus 25 employs a 16-bit type similar to that mentioned before. That is, the data bus 25 comprises 16 data signal lines DT0 to DT15.

At the time of the design of the protocol controller 20, devices to be connected externally to the protocol controller 20 become apparent from the type of a transaction apparatus which is to incorporate the protocol controller 20. Whereupon, in this embodiment, at the manufacture of the protocol controller 20, each of the data signal lines DT0 to DT15 of the data bus 25 is previously connected through a pull-up resistor 113 to a high electric potential (+V) or connected through a pull-down resistor 114 to a low electric potential (ground: GND) to satisfy the needs of the types of devices to be connected to the protocol controller 20.

Furthermore, the CPU 21 of the protocol controller 20 specifies a predetermined logical address, in this embodiment the leading address C00000 of the exterior type ROM 54a (see FIG. 12), through the address bus 24 at the time of starting of the system to read out data through the data signal lines DT0 to DT15.

In this embodiment, in the case that the exterior type ROM 54a is connected to the protocol controller 20, the information about the devices to be connected to this protocol controller 20 is set in advance in the leading address C00000 of the exterior type ROM 54a in the form of a 16-bit structure information register (HWSTR: Hardware Structure Register) shown in FIG. 26.

Thus, if the exterior type ROM 54a is in connection with the protocol controller 20, by specifying the address C00000, the CPU 21 can read out the information in the structure information register (HWSTR) through the data bus 25.

On the contrary, if the exterior type ROM 54a is in no connection with the protocol controller 20, by specifying the address C00000, the CPU 21 reads out the high electric potential state/low electric potential state [1 (High)/0 (Low)], generated by the pull-up resistor 113/pull-down resistor 114 in the data signal lines DT0 to DT15, as the structure information data.

In this case, the 16-bit structure information data set by the pull-up resistor 113 and the pull-down resistor 114 is set to coincide fully with the data in the 16-bit structure information register (HWSTR) to be set at the leading address C00000 of the exterior type ROM 54a.

Figure 26:
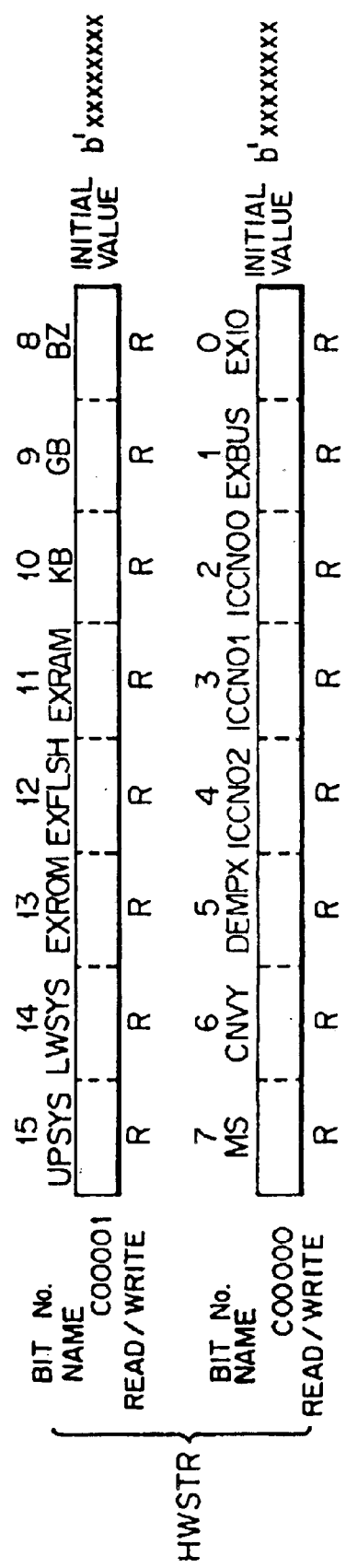
FIG. 26 illustrates an arrangement of a configuration information register (HWSTR) in the protocol controller according to this embodiment.

Referring to FIGS. 26 to 28, a description will be given hereinbelow of the data in the structure information register (HWSTR), that is, a method of setting the structure information data by the pull-up resistor 113 and the pull-down resistor 114.

Incidentally, the bit numbers 0 to 15 of the structure information register (HWSTR) correspond to the data signal lines DT0 to DT15 of the data bus 25, respectively. Concretely, if the bit number i (i=0 to 15) of the structure information register (HWSTR) assumes 0, the data signal line DTi is connected through the pull-down resistor 114 to the low electric potential (GND). On the other hand, if the bit number i of the structure information register (HWSTR) assumes 1, the data signal line DTi is connected through the pull-up resistor 113 to the high electric potential (+V).

As FIGS. 26 and 27 show, the connection (0)/non-connection (1) of an extended I/O is set when the bit number takes 0, that is, when the data signal line DT0 is taken, while the connection (0)/non-connection (1) of an extended bus is set when the bit number assumes 1, that is, when the data signal line DT1 is taken. Further, the connection (0)/non-connection (1) of a card switch (demultiplexer 340) is set with the bit number 5, that is, with the data signal line DT5.

Furthermore, as shown in FIGS. 26 to 28, the number of (0 to 6) IC cards 330 to be connected to the protocol controller 20 is set with the bit numbers 2 to 4, that is, with the data signal lines DT2 to DT4.

Still further, the connection (0)/non-connection (1) of a conveying device (card conveyer 64) is made with the bit number 6, i.e., the data signal line DT6, while the connection (0)/non-connection (1) of the MS reader 63 is made with the bit number 7, i.e., the data signal line DT7. Moreover, the connection (0)/non-connection (1) of the buzzer 62 is made with the bit number 8, i.e., the data signal line DT8, while the connection (0)/non-connection (1) of the green button 61 is made with the bit number 9, i.e., the data signal line DT9, and even, the connection (0)/non-connection (1) of the keyboard 60 is made with the bit number 10, i.e., the data signal line DT10.

In like manner, the connection (0)/non-connection (1) of the exterior type RAM 54b is set with the bit number 11, that is, with the data signal line DT11, while the connection (0)/non-connection (1) of the exterior type FLASH 54c is set with the bit number 12, that is, with the data signal line DT12. Further, the connection (0)/non-connection (1) of the exterior type ROM 54a is set with the bit number 13, that is, with the data signal line DT13, while the connection (0)/non-connection (1) of a lower unit (for example, the subsystem 52) is set with the bit number 14, that is, with the data signal line DT14, and even, the connection (0)/non-connection (1) of an upper unit (for example, the host system 51) is set with the bit number 15, that is, with the data signal line DT15.

For instance, in the case of the example as shown in FIG. 23, at least the exterior type ROM 54a, the exterior type RAM 54b and the FROM (FLASH) 54c are connected as devices; hence, each of the data signal lines DT13, DT11, DT12 in the protocol controller 20 is connected through the pull-down resistor 114 to the low electric potential (GND).

Moreover, in the example as shown in FIG. 24, because at least the exterior type RAM 54b and the FROM (FLASH) 54c are connected as devices, each of the data signal lines DT11, DT12 in the protocol controller 20 is accordingly connected through the pull-down resistor 114 to the low electric potential (GND).

Besides, in the examples as shown in FIGS. 23 and 24, because each of the data signal lines DT0, DT1 is connected through the pull-down resistor 114 to the low electric potential (GND), although not shown in FIG. 23 or 24, an extended I/O and an extended bus are also in connection.

Furthermore, the CPU 21 functions as a recognizing section to recognize a connection state of a device connected to the protocol controller 20, to which it pertains, (that is, which device of the various types of devices shown in FIG. 27 is connected thereto) on the basis of the structure information data obtained by specifying the logical address C00000.

Besides, contrary to the above, it is also appropriate that the data signal line DTi of the data bus 25 is connected through the pull-up resistor 113 to the high electric potential if a device is in connection with the protocol controller 20, while the data signal line DTi of the data bus 25 is connected through the pull-down resistor 114 to the low electric potential if a device is not in connection with the protocol controller 20.

Figure 25:
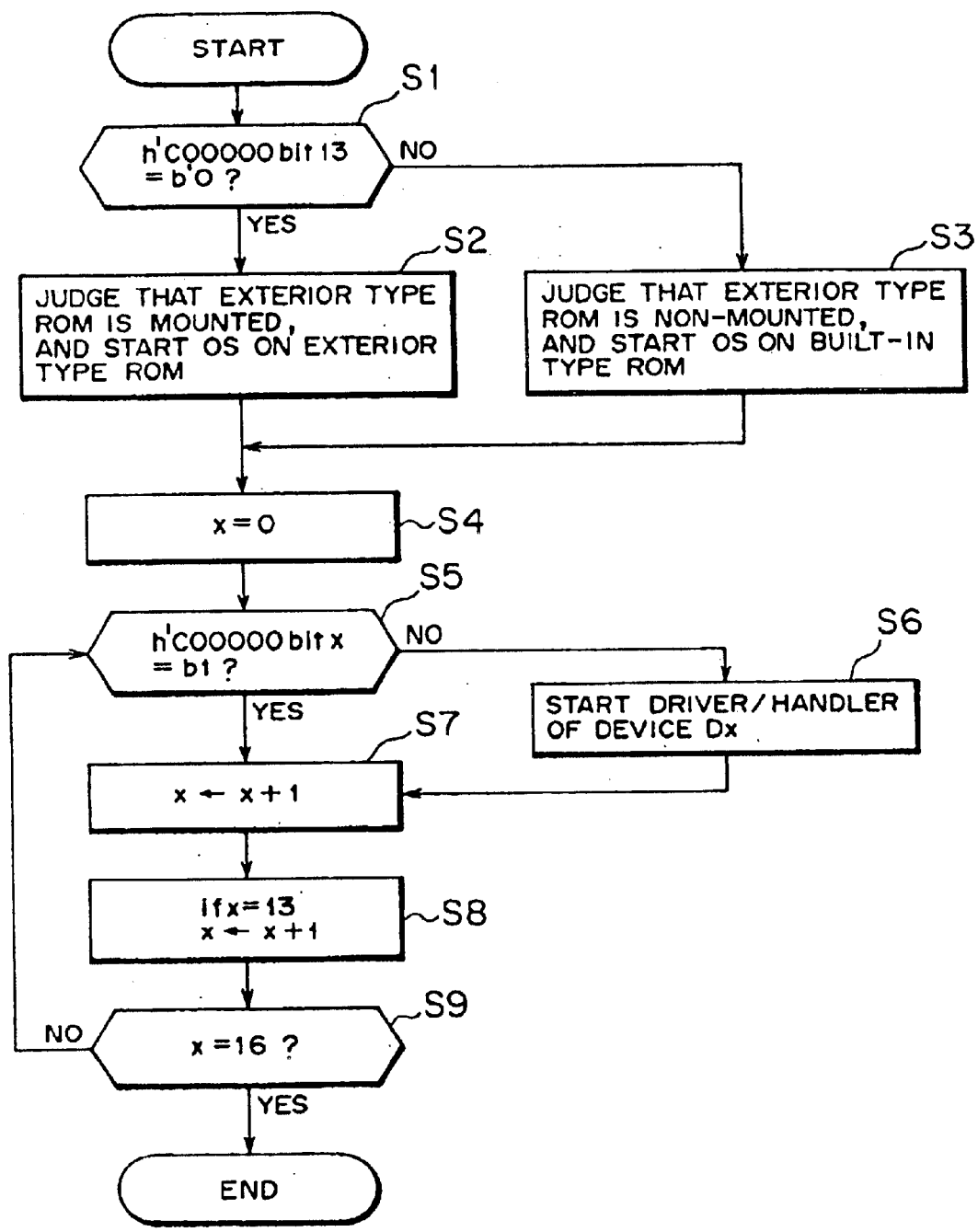
FIG. 25 is a flow chart available for describing a device connection state recognizing procedure in the protocol controller according to this embodiment.

Subsequently, according to the flow chart (steps S1 to S9) as shown in FIG. 25, a description will be taken hereinbelow of a procedure for the device connection state recognition in the CPU 21 of the protocol controller 20 according to this embodiment. Incidentally, in this embodiment, the CPU 21 recognizes the connection/non-connection of a device concurrently with starting the driver/handler (device control program) of the device connected.

At the time of starting of the system, the CPU 21 first specifies, through the address bus 24, the logical address C00000 allocated as the leading address of the exterior type ROM 54a, thereby gaining the 16-bit structure information data through the data bus 25 to judge whether or not the data obtained through the data signal line DT13 is "0" (step S1). That is, first of all, the CPU 21 recognizes whether or not the exterior type ROM 54a is in connection.

If that data assumes "0" (YES route from step S1), the CPU 21 makes a decision that the exterior type ROM 54a is mounted, and then starts the OS 521 (see FIGS. 13 and 15) on this exterior type ROM 54a (step S2). On the other hand, if the decision in the step S1 indicates that the data on the data signal line DT13 does not assume "0", that is, takes "1" (NO route from step S1), the CPU 21 makes a decision that the exterior type ROM 54a is not mounted yet, and hence starts the OS 521 on the built-in ROM 22 (step S3).

After the starting of the OS 521, the CPU 21 successively checks the data on the data signal lines 0 to 12, 14 and 15 other than the data signal line DT13. Concretely, "0" is set as the bit number x (step S4), before a judgment is made as to whether or not the data obtained through the data signal line DTx (x=0 to 12, 14 and 15) is "1" (step S5).

If that data does not assume "1", that is, takes "0" (NO route from step S5), the CPU 21 reads out the driver/handler of the device Dx corresponding to the bit number x from the device control program group 530 (see FIGS. 13 and 15) and starts it (step S6), then proceeding to a step S7 to be described hereinbelow.

On the other hand, if the decision in the step S5 shows that the data on the data signal line DTx is "1" (YES route from step S5), the CPU 21 judges that the device Dx is not mounted yet, and then adds 1 to the bit number x (step S7). At this time, if a new bit number x is the bit number 13 already subjected to judgment, it further adds 1 to the bit number x (step S8).

Furthermore, the CPU 21 judges whether or not a new bit number x is "16" (step S9). If x=16 (YES route), the CPU 21 terminates the processing. If x≠16 (NO route), the CPU 21 returns to the step S5 to repeatedly conduct the same processing.

In this way, in the device connection state recognizing method in the protocol controller 20 according to this embodiment, if only reading out, as the structure information data, the high electric potential state (1)/low electric potential state (0) generated through the pull-up resistor 113/pull-down resistor 114 on the data signal lines DT0 to DT15, the CPU 21 can recognize the device connection state on the basis of the read structure information data with no addition of a dedicated signal line for detection or the like, and can start only the driver/handler (device control program) corresponding to that device.

While the ROM 22 or the exterior type ROM 54a to be mounted on the protocol controller 20 according to this embodiment stores the control program 5A or 5B having the drivers/handlers (device control programs) for all the devices, capable of being connected to the protocol controller 20, for accomplishing the versatility, even in the case of employing such versatile ROMs 22 and 54a, the CPU 21 can recognize the device as noted above, thereby starting only the driver/handler (device control program) for the connected device.

Accordingly, it is possible to eliminate the need for preparing a ROM storing a different control program at every transaction apparatus (computer system) incorporating the protocol controller 20 and to save the trouble to be needed in mounting a program in a ROM coupled with simplifying the component management, which contributes to considerable reduction of the cost required for the manufacture of various types of transaction apparatus (systems).

[3] Description of Method of Controlling Data Transfer Between Protocol Controller According to this Embodiment and IC cards As described before with reference to FIG. 11, in this embodiment, the demultiplexer 340 is interposed between the protocol controller 20 and a maximum of IC cards 330, mountable in this protocol controller 20.

That is, in this embodiment, in a way of placing the demultiplexer 340 between the protocol controller 20 and the IC card 330, the protocol controller 20 is designed to control a maximum of six IC cards 330 through the use of its two ports A and B, in other words, its two IC card control circuits 36A and 36B.

This demultiplexer 340 makes connections between the six IC cards 330 and IC card control circuits 36A, 36B (ports A, B) of the protocol controller 20 as needed, and functions as a data transfer control unit (card switch) for controlling data transfer therebetween, thus selectively switching two IC cards 330 to be accessed by the protocol controller 20 and the ports A, B for connection therebetween.

Figure 31:
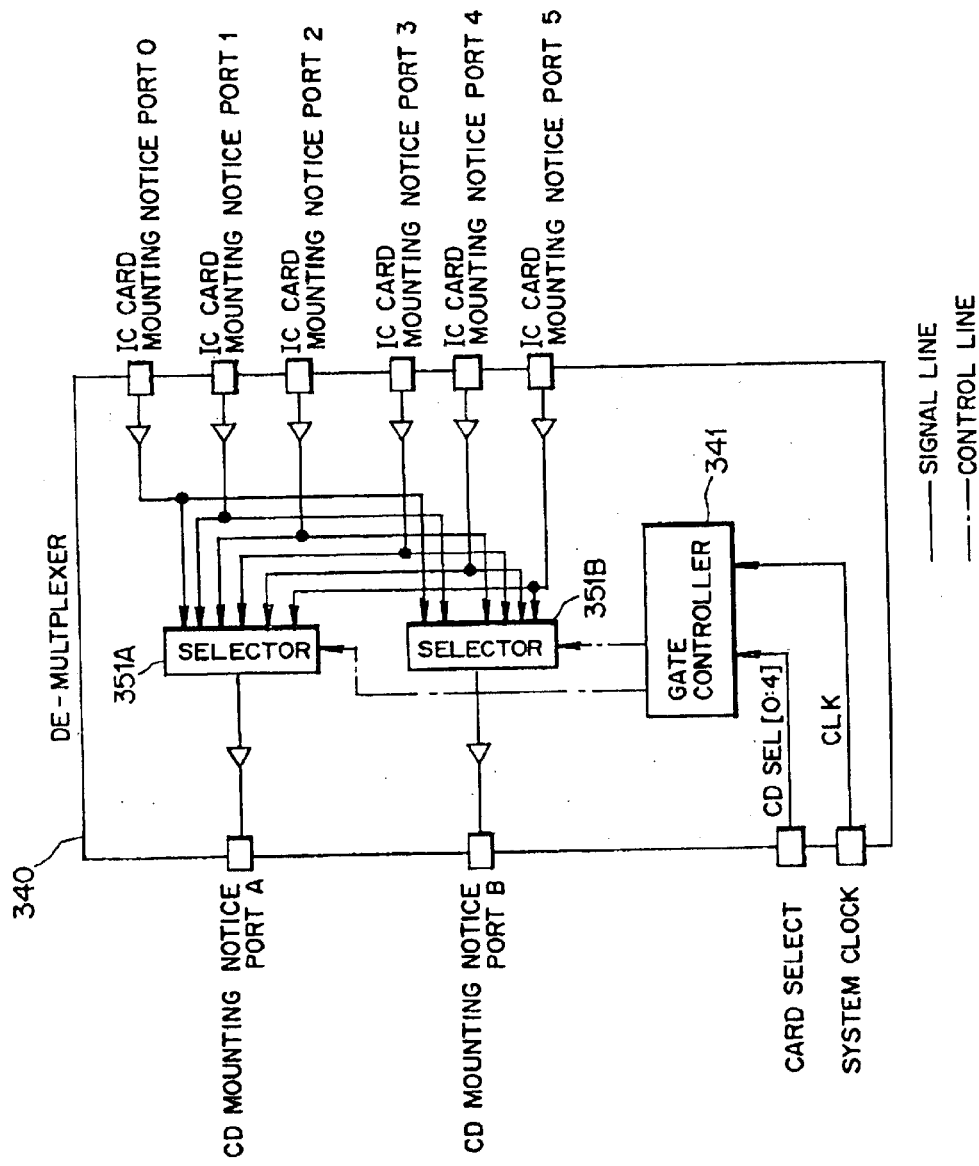

Referring to FIGS. 29 to 31, a description will be made hereinbelow of a detailed and configuration of the demultiplexer 340.

FIG. 29 shows a configuration of a switching circuit in the demultiplexer 340 for signals (data and C4/C8 signals) to be bidirectionally communicated between the protocol controller 20 and the IC cards 330, FIG. 30 shows a configuration of a switching circuit in the demultiplexer 340 for signals (reset signals) to be communicated in one way from the protocol controller 20 to the IC cards 330, and FIG. 31 illustrates a configuration of a switching circuit in the demultiplexer 340 for signals (IC card mounting notice signals) to be communicated in one way from the IC cards 330 to the protocol controller 20. Further, as well as FIG. 11, in FIGS. 29 to 31, the six IC cards 330 (ICC0 to ICC5) are respectively mounted in the actual card ports (which will be referred hereinafter to as ports 0 to 5) to which port numbers 0 to 5 are given.

As shown in FIGS. 29 to 31, in this embodiment, the demultiplexer 340 is composed of a gate controller 341, two-input one-output selectors 342-0 to 342-5, 347-0 to 347-5, six-input one-output selectors 345A, 345B, 351A, 351B, latch circuits 343-0 to 343-5, 348-0 to 348-5, and three-state input/output ports 344-0 to 344-5, 346A, 346B, 349-0 to 349-5.

The gate controller 341 operates when receiving a system clock, and is for controlling the operations of the selectors 342-0 to 342-5, 347-0 to 347-5, the selectors 345A, 345B, 351A, 351B, the latch circuits 343-0 to 343-5, 348-0 to 348-5 and the three-state input/output ports 344-0 to 344-5, 346A, 346B, 349-0 to 349-5 in accordance with a select signal CDSEL[0:4] from the card selector 43 of the protocol controller 20. The select signal CDSEL[0:4] will be described in detail with reference to FIGS. 33 and 34 herein later.

As FIG. 29 shows, in the demultiplexer 340, the switching circuit for the signals (data and C4/C8 signals) to be communicated bidirectionally between the protocol controller 20 and the IC cards 330 is provided with the selectors 342-0 to 342-5, 345A, 345B, the latch circuits 343-0 to 343-5, the three-state input/output ports 344-0 to 344-5, and the three-state input/output ports 346A, 346B.

In this arrangement, each of the selectors 342-0 to 342-5 operates under control of the gate controller 341, and is for selectively switching (selecting) either of data (or C4/C8 signals) outputted from the two ports A, B of the protocol controller 20 and for outputting it to each of the six IC cards 330 (ICC0 to ICC5) sides.

The latch circuits 343-0 to 343-5 operate under control of the gate controller 341, and are for, when the ICC0 to ICC5 do not undergo access, respectively latching the signals, outputted from the selectors 342-0 to 343-5, immediately before the transition to the non-accessed state.

The three-state input/output ports 344-0 to 344-5 are to be controlled by the gate controller 341 to provide a high impedance state when the ICC0 to ICC5 are not the object of access, or when the signals to be outputted to the ICC0 to ICC5 take "1", that is, a High state.

The selectors 345A, 345B are controlled by the gate controller 341 to selectively switch (select) any one of the data (or C4/C8 signals) outputted from the six IC cards 330 and further to output it to the ports A, B of the protocol controller 20.

With the above-described configuration, the data or the C4/C8 signals from the IC cards 330 to be connected to the port A of the protocol controller 20 are selected by the selector 345A and then inputted to the port A of the protocol controller 20, while the data or the C4/C8 signals from the IC cards 330 to be connected to the port B of the protocol controller 20 are selected by the selector 345B and then inputted to the port B of the protocol controller 20. Further, the data or the C4/C8 signals from the port A or B of the protocol controller 20 to be coupled to the ICCi (i=0 to 5) are selected by the selector 342-i and then outputted through the latch circuit 343-i and the three-state input/output port 344-i to the ICCi.

As shown in FIG. 30, in the demultiplexer 340, the switching circuit for the signals (reset signals) to be communicated in one way from the protocol controller 20 to the IC cards 330 is provided with the selectors 347-0 to 347-5, the latch circuits 348-0 to 348-5 and the three-state input/output ports 349-0 to 349-5.

The selectors 347-0 to 347-5 work under control of the gate controller 341, and are for selectively switching (selecting) either of the reset signals outputted from the two ports A, B of the protocol controller 20 to output it to the six IC cards 330 (ICC0 to ICC5) sides.

The latch circuits 348-0 to 348-5 work under control of the gate controller 341, and are for, when the ICC0 to ICC5 do not undergo access, respectively latching the reset signals outputted from the selectors 342-0 to 342-5 immediately before the transition to the non-accessed state.

The three-state input/output ports 349-0 to 349-5 are each controlled by the gate controller 341 to assume a high impedance state when the ICC0 to ICC5 are out of the object of access, or when the signals to be outputted to the ICC0 to ICC5 are "1", that is, are in a High state.

With the above-described configuration, the reset signal from the port A or B of the protocol controller 20 to be connected to the ICCi (i=0 to 5) is selected by the selector 347-i and then outputted through the latch circuit 348-i and the three-state input/output port 349-i to the ICCi.

As FIG. 31 shows, in the demultiplexer 340, the selectors 351A, 351B are placed in the switching circuit for the signals (IC card mounting notice signals) to be communicated in one way from the IC cards 330 to the protocol controller 20.

As mentioned before, the IC card mounting notice lines intervene between the ports A, B of the protocol controller 20 and the ports 0 to 5 for the IC cards 330, and the information (IC card mounting notice signal) indicative of whether or not each of the IC cards (ICC0 to ICC5) 330 is mounted in each of the ports 0 to 5 is given in one way to the ports A, B (IC card control circuits 36A, 36B) of the protocol controller 20.

Furthermore, the selectors 351A, 351B are controlled by the gate controller 341 to selectively switch (select) any one of the IC card mounting notice signals outputted from the six IC cards 330 for outputting it to the ports A, B of the protocol controller 20, respectively.

With the above-described configuration, the IC card mounting notice signals from the IC cards 330 to be connected to the port A of the protocol controller 20 are selected by the selector 345A and then inputted to the port A of the protocol controller 20, while the IC card mounting notice signals from the IC cards 330 to be connected to the port B of the protocol controller 20 are selected by the selector 345B and then inputted to the port B of the protocol controller 20.

Figure 32:
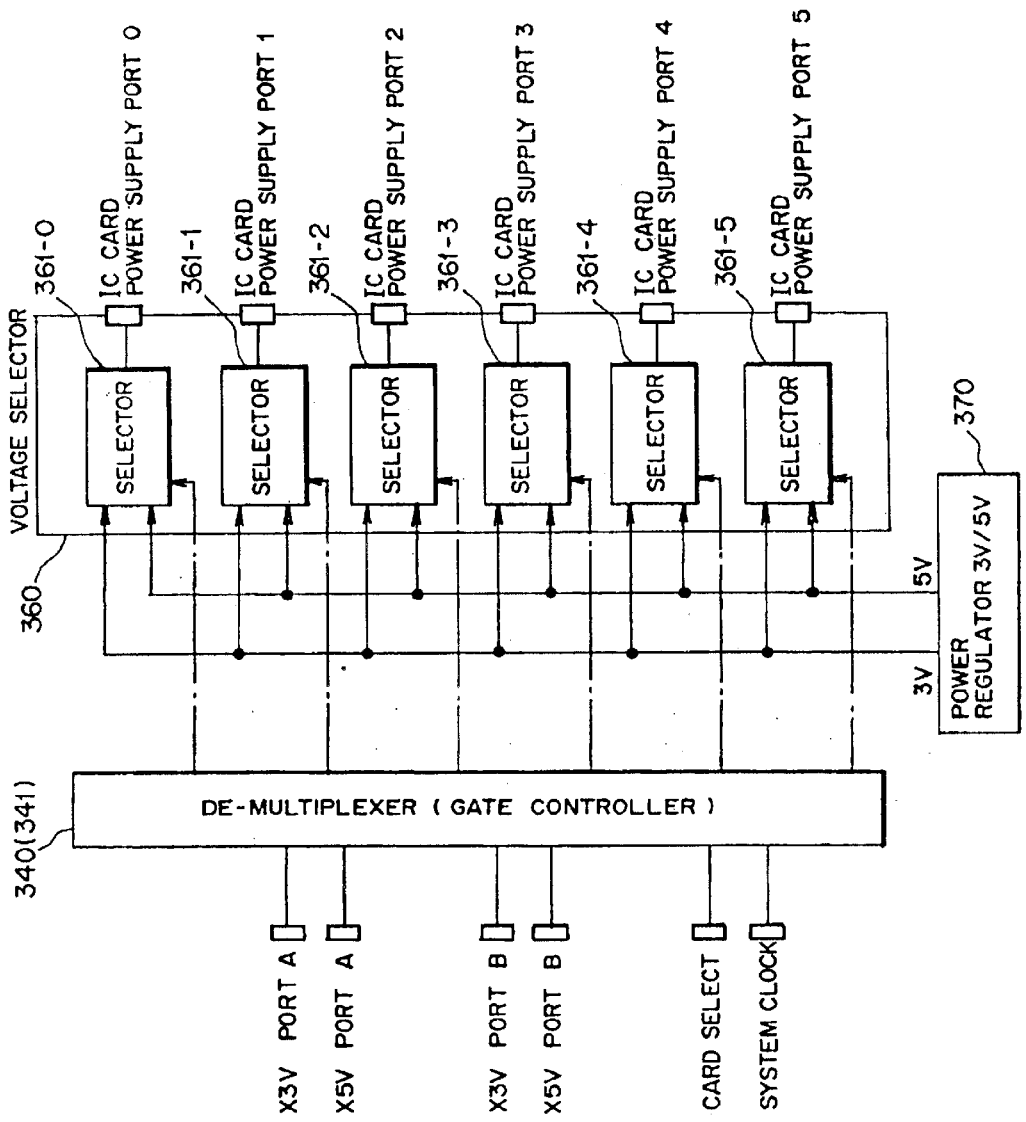
FIG. 32 is a block diagram showing an arrangement of a power supply system to an IC card, connected to the protocol controller according to this embodiment.

FIG. 32 is an illustration of a configuration of a power supply system to the IC cards 330, up to six in number, to be connected to the protocol controller 20 according to this embodiment. Also in FIG. 32, the six IC cards 330 (ICC0 to ICC5) are respectively mounted in the actual card ports (which will be referred hereinafter to as ports 0 to 5) to which port numbers 0 to 5 are given.

As FIG. 32 shows, in this embodiment, the power supply system is, as mentioned before with reference to FIG. 11, made up of the demultiplexer 340, the voltage selector 360 and the power regulator 370.

As noted before, the power regulator 370 produces and outputs two kinds of voltages: 3V and 5V, while the voltage selector 360 selects a voltage of 3V or 5V in accordance with an instruction from the demultiplexer 340, then supplying and applying it to each of the IC cards 330.

Furthermore, the voltage selector 360 is made up of two-input one-output selectors 361-0 to 361-5. These selectors 361-0 to 361-5 operate under control by the demultiplexer 340 (gate controller 341), and are for, when the ICC0 to ICC5 are mounted, selectively switching (selecting) either of the two voltages 3V, 5V from the power regulator 370 to always supply it as power to the six IC cards 330 (ICC0 to ICC5).

At this time, the demultiplexer 340 (gate controller 341) controls the selectors 361-0 to 361-5 of the voltage selector 360 in accordance with a signal from the card power control circuit 42 (see FIG. 11) of the protocol controller 20.

With the above-described construction, if the power voltage to be supplied to the ICCi (i=0 to 5) is 3V, the selector 361-i selects the power of 3V from the power regulator 370 to supply it to the ICCi. If the power voltage to be supplied to the ICCi (i=0 to 5) is 5V, the selector 361-i selects the power of 5V from the power regulator 370 to supply it to the ICCi.

Besides, as shown in FIG. 11, clock signals (control clocks) needed are supplied from the six card clock generators 38 in the protocol controller 20 according to this embodiment through the clock signal lines 350 to a maximum of six IC cards 330 connectable to the protocol controller 20, respectively. That is, in this embodiment, the clock signals for use in the IC cards 330 are supplied from the protocol controller 20 through the clock signal lines 350, whose number is the same as that (6) of the IC cards 330, to the IC cards 330, respectively, while the six IC cards 330 share the data transfer signal lines (data lines, C4 signal lines, C8 signal lines, reset signal lines, and others), provided in the two ports A, B of the protocol controller 20, through the demultiplexer 340.

Referring to FIGS. 33 and 34, a description will be made hereinbelow of a select signal CDSEL[0:4] to be supplied from the card selector 43 of the protocol controller 20 to the demultiplexer 340. FIG. 33 shows a configuration of an IC card port allocation register (CDSEL) to be used for when, in the protocol controller 20 according to this embodiment, a select signal CDSEL[0:4] is outputted to the demultiplexer 340, while FIG. 34 is an illustration for explaining the sense of each of bits in that IC card port allocation register.

As FIG. 33 shows, the IC card port allocation register (CDSEL) is, for example, 1-bite data set at the logical address 002080, with its low-order 5 bits (bit numbers 0 to 4) being put to use.

Such a 5-bit select signal CDSEL[0:4] is set as shown in FIG. 34, whereby selected are the IC card 330 (any one of the ICC0 to ICC5) to be connected to the port A of the protocol controller 20 and the IC card 330 (except the IC card 330 to be connected to the port A) to be connected to the port B of the protocol controller 20.

However, if all the 5 bits of the select signal CDSELC [0:4] are set to "0" as shown in FIG. 34, this select signal CDSEL[0:4] is used as a reset instruction signal of the demultiplexer 340 (including the latch circuits 343-0 to 343-5, 348-0 to 348-5). Further, if all the 5 bits of the select signal CDSEL[0:4] are set to "1", this select signal CDSEL [0:4] is used as a latch instruction signal for latching all the output signals to the IC cards 330 by the latch circuits 343-0 to 343-5, 348-0 to 348-5.

Figure 35:
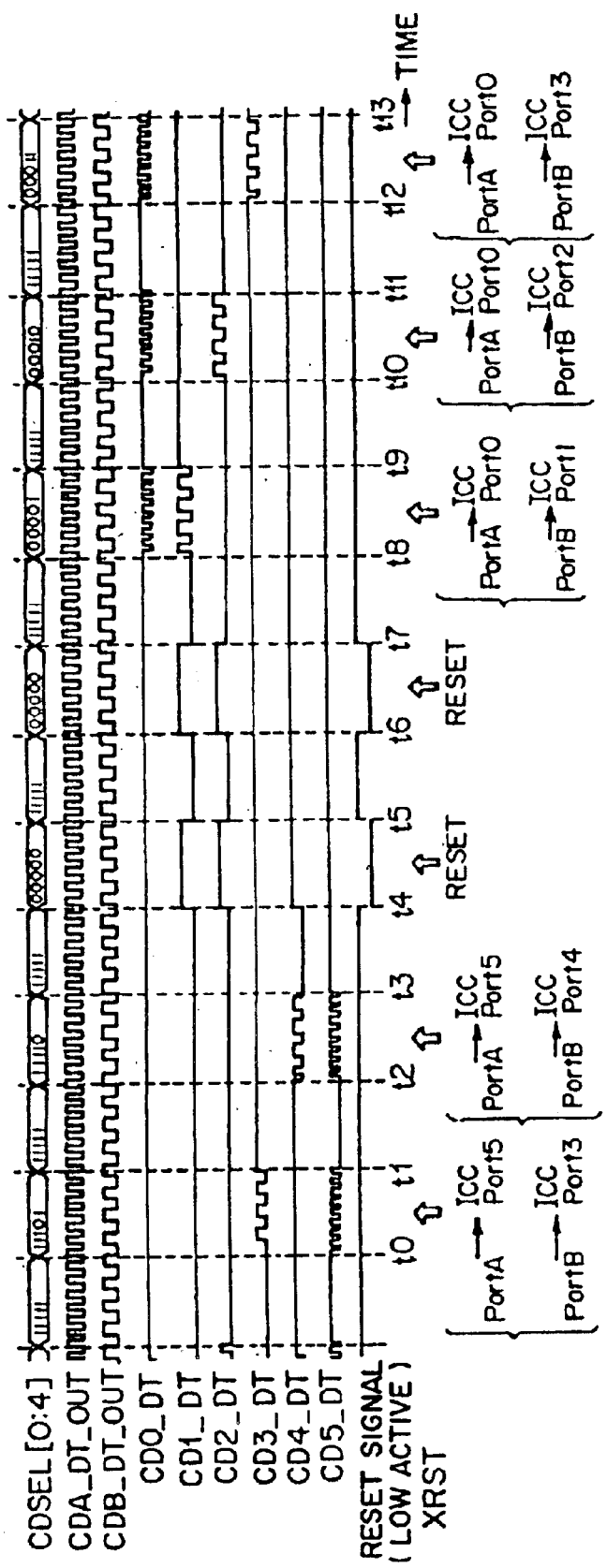
FIGS. 35 and 36 are time charts each for explaining an operation of the demultiplexer in this embodiment.
Figure 36:
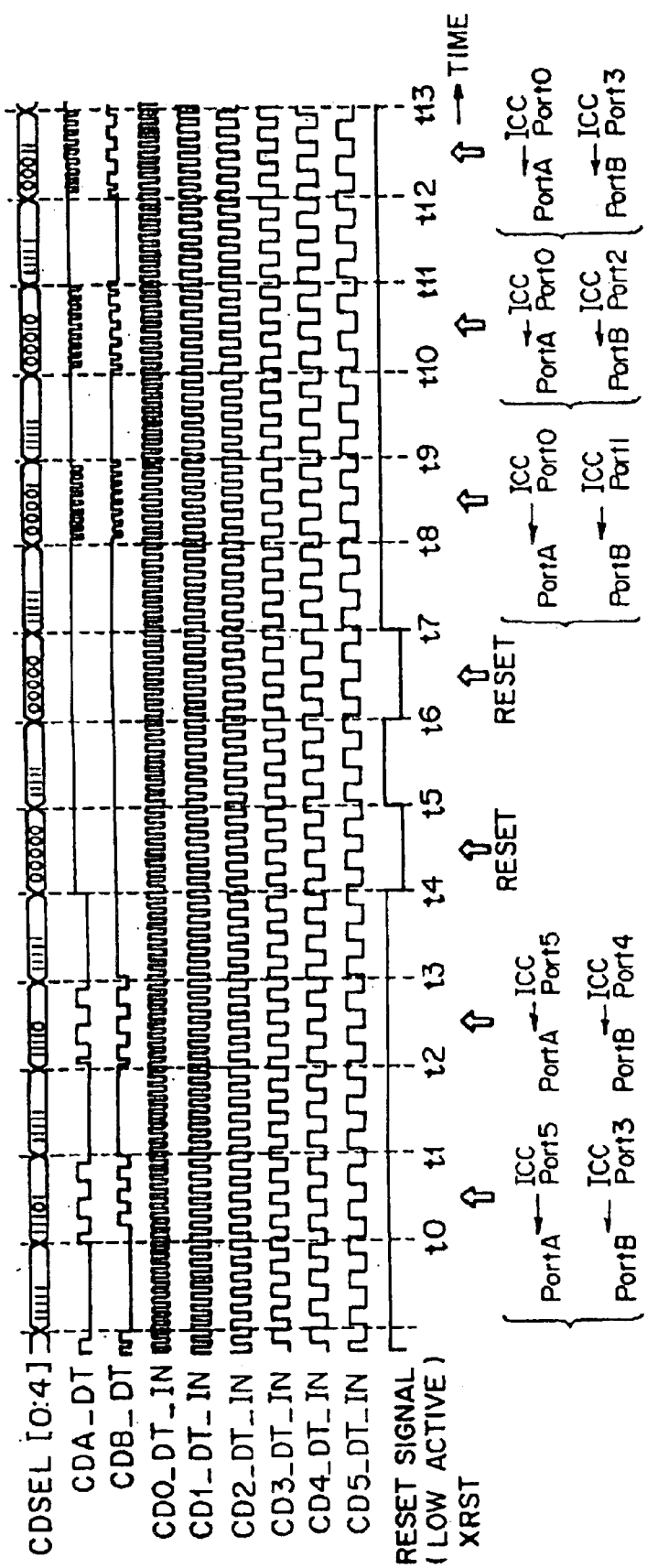

Secondly, referring to FIGS. 35 and 36, a description will be given hereinbelow of a concrete switching operation of the demultiplexer 340 caused by the select signal CDSEL [0:4]. FIGS. 35 and 36 are time charts each for describing the switching operation of the demultiplexer 340 in this embodiment.

FIG. 35 shows signal waveforms to be outputted from the demultiplexer 340 to the IC cards 330 (ICC0 to ICC5) in the case that the protocol controller 20 controls the demultiplexer 340 through the use of the select signal CDSEL[0:4] to switch the IC cards 330 (ICC0 to ICC5) to be connected to the ports A, B in a state where rectangular waves with constant cycles are always outputted from the two ports A, B.

FIG. 36 illustrates signal waveforms to be inputted from the demultiplexer 340 to the ports A, B of the protocol controller 20 in the case that the protocol controller 20 controls the demultiplexer 340 through the use of the select signal CDSEL[0:4] to switch the IC cards 330 (ICC0 to ICC5) to be connected to the ports A, B in a state where the IC cards 330 (ICC0 to ICC5) always output rectangular waves with constant cycles.

In FIGS. 35 and 36, during the period from the time t0 to the time t1, the select signal CDSEL[0:4] is "11101" so that the ICC5 is connected to the port A while the ICC3 is connected to the port B. In like manner, during the period from the time t2 to the time t3, the select signal CDSEL[0:4] comes to "11110" so that the ICC5 is connected to the port A while the ICC4 is connected to the port B. During the period from the time t8 to the time t9, the select signal CDSEL[0:4] becomes "00001", thereby making a connection between the ICC0 and the port A and making a connection between the ICC1 and the port B. Further, during the period from the time t10 to the time t11, the select signal CDSEL[0:4] assumes "00010", thereby establishing a connection between the ICC0 and the port A and establishing a connection between the ICC2 and the port B. Still further, during the period from the time t12 to the time t13, the select signal CDSEL[0:4] forms "00011" to cause the ICC0 to be connected to the port A while causing the ICC3 to be connected to the port B. On the other hand, during the periods from the time t4 to the time t5 and from the time t6 to the time t7, the select signal CDSEL[0:4] forms "00000", thereby producing a reset signal XRST (low active) as mentioned before.

As shown in FIG. 35, a signal to be outputted from the demultiplexer 340 to each of the IC cards 330 (ICC0 to ICC5) is latched whenever the connection-accepting IC card 330 is switched by the select signal CDSEL[0:4] so that its state immediately before the switching is retained. Further, a signal from the corresponding port A or B is outputted to the selected IC card 330.

As shown in FIG. 36, signals inputted from the IC cards 330 (ICC0 to ICC5) to the demultiplexer 340 are switched in accordance with the select signal CDSEL[0:4] and outputted to the corresponding port A or B.

As mentioned before with reference to FIG. 11, in the protocol controller 20, the IC card control circuits 36A, 36B are provided for the ports A, B, respectively, and each of the IC card control circuits 36A, 36B operates in accordance with an instruction from the CPU 21 in the protocol controller 20, thereby accomplishing the access from the protocol controller 20 to the respective IC cards 330.

Furthermore, when receiving a command from each of the IC card control circuits 36A, 36B, each of the IC cards 330 under communication transmits a response to that command to each of the IC card control circuits 36A, 36B. The IC cards 330, being out of communication (out of the object of access), take a command waiting condition while receiving the supply of clock signals through the clock signal lines 350 and further receiving the power supply of a predetermined voltage (3V/5V) from the voltage selector 360 and the power regulator 370, so they can receive the command from each of the IC card control circuits 36A, 36B any time.

Still further, in a state where the plurality of IC cards 330 are connected to the protocol controller 20, the two IC card control circuits 36A, 36B, which have received instructions from the CPU 21 of the protocol controller 20, operate simultaneously, thereby gaining the access to the two portable type mediums 330 connected to the two ports A, B through the demultiplexer 340. In this way, by simultaneously having the access to the two portable type mediums 330, the protocol controller 20 conducts the data transfer processing to/from the two portable type mediums 330, 330.

As described above, with the data transfer control method in this embodiment, because the connection states between the two ports A, B and the six IC cards 330 are switched through the use of the demultiplexer 340 to allow the access to the IC cards 330 larger in number than the ports on the protocol controller 20 side, in the case of increasing the number of IC cards 330 to be controlled by the protocol controller 20, it is possible to eliminate the need for increasing the ports or the IC card control circuits on the protocol controller 20 side.

Accordingly, it is possible to increase the number of IC cards 330 to be controlled without raising the manufacturing cost of the protocol controller 20. Particularly, in the case of the integrated protocol controller 20 like this embodiment, even if the number of IC cards 330 to be controlled increases, there is no need to integrate a large number of lines or IC card control circuits at a high density, which greatly contributes to the reduction of the manufacturing cost or the circuit scale.

In addition, now that the signal states to the IC cards 330 being out of the object of access are latched, it is possible to certainly prevent the signal states to the IC cards 330 from fluttering and unstable immediately after these IC cards 330 are switched from non-accessed states to the accessed states.

Furthermore, through the use of the select signal CDSEL [0:4] from the protocol controller 20, it is possible to reset the switching operations by the demultiplexer 340 and the latching operations of the latch circuits 343-0 to 343-5, 348-0 to 348-5, or to latch all the output signals to a plurality of IC cards 330 with the latch circuits 343-0 to 343-5, 348-0 to 348-5, thus the operating state of the demultiplexer 340 and the latch state become easily controllable according to various situations.

Besides, in the case that the number of IC cards 330 to be connected to the protocol controller 20 is two and below, it is also appropriate to directly control the IC cards 330 through the two ports A, B of the protocol controller 20 without using the external demultiplexer 340.

Still further, although, in this embodiment, the demultiplexer 340 is constructed separately from the protocol controller 20, it is also appropriate that the demultiplexer 340, together with the protocol controller 20, is integrated on the same chip for unification.

Moreover, although, in the description of this embodiment, the number of ports of the protocol controller 20 is two and the maximum number of IC cards 330 to be connected to the protocol controller 20 is 6, this invention is not limited to these numbers.

[4] Others

It should be understood that the present invention is not limited to the above-described embodiment, and that it is intended to cover all changes and modifications of the embodiment of the invention herein which do not constitute departures from the spirit and scope of the invention.

For instance, although the above description of the present embodiment has been made in the case that the portable type mediums form IC cards, this invention is not limited to this, but is likewise applicable to portable type mediums such as optical cards and radio cards, and the same effects as those of the above-described embodiment can be given also in this case.

Furthermore, although, in the above-described embodiment, the digital money are of two types, this invention is not limited to this. If handling three or more types of digital money, the control program 5A or 5B is made to have a protocol control program corresponding to the protocol for each kind of the digital money, which can provide the same effects as those of the above-described embodiment.

Still further, although the above description of this embodiment has been made in the case that the apparatus to which the integrated circuit according to the present invention is applied are various types of transaction apparatuses which can handle digital money as data, this invention is not limited to this, but is also applicable to various kinds of apparatus which handle various types of data (medical data, personal data, and others) capable of being stored in portable type mediums, and can offer the same effects as those of the above-described embodiment.

What is claimed is:

1. An integrated circuit for protocol control to be incorporated into an apparatus capable of handling digital money defined as a symbol of electronic currency, said integrated circuit being configured by integrating, on one chip, a storage section for storing a plurality of control programs, one prepared for each of a plurality of protocols for a plurality of kinds of digital money different in mode from each other; a processing section for controlling the handling of said plurality of kinds of digital money, different in mode, in the apparatus by executing one control program corresponding to a mode of digital money that is to be handled in the apparatus into which said integrated circuit is to be incorporated, which one control program is assigned from said plurality of control programs stored in said storage section; and an interface circuit connected to an external circuit including at least one of an external processing section and an external storage section to fulfill an interface function between said external circuit and said processing section.

2. An integrated circuit for protocol control as defined in claim 1, wherein a peripheral control circuit, which fulfills a control function related to processing of digital money, is additionally integrated on said chip.

3. An integrated circuit for protocol control as defined in claim 2, wherein said peripheral control circuit includes a medium control circuit which operates under control of said processing section and said control program to control a portable type medium storing digital money.

4. An integrated circuit for protocol control as defined in claim 2, wherein said peripheral control circuit includes a communication control circuit which operates under control of said processing section and said control program to control a communication with an external circuit.

5. An integrated circuit for protocol control as defined in claim 2, wherein said peripheral control circuit includes a display control circuit which operates under control of said processing section and said control program to control an external display unit.

6. An integrated circuit for protocol control as defined in claim 2, wherein said peripheral control circuit includes an input control circuit which operates under control of said processing section and said control program to perform input processing of a signal from an external input unit.

7. An integrated circuit for protocol control as defined in claim 2, wherein said control program includes:
  one or more device control programs for controlling one of said external circuit connected to said interface circuit and said peripheral control circuit as a device;
  a plurality of protocol control programs for controlling said device control program in relation to each of said plurality of kinds of digital money different in mode; and
  an application program for controlling said device control program and said protocol control programs.

8. An integrated circuit for protocol control as defined in claim 7, wherein, when receiving a control telegraphic statement including a digital money classification field specifying one of said plurality of kinds of digital money different in mode and a transaction classification field specifying a transaction classification common to said plurality of kinds of digital money different in mode, said application program conducts a transaction, specified by said transaction classification field, through the use of said protocol control program corresponding to the kinds of digital money specified by said digital money classification field.

9. An integrated circuit for protocol control as defined in claim 8, wherein, when receiving said control telegraphic statement including a device classification field specifying said device control program and an instruction field describing a control instruction to said device control program, said application program informs said device control program, specified by said device classification field, of an instruction described in said instruction field, and makes said device control program execute said instruction, and further, transmits a response to said instruction from said device control program as response telegraphic statement to the instruction issuer.

10. An integrated circuit for protocol control as defined in claim 9, wherein, in said control telegraphic statement, said digital money classification field and said device classification field are placed in common in the same field, while specification data for when said field is used as said digital money classification field and specification data for when said field is employed as said device classification field are mutually exclusive values.

11. An integrated circuit for protocol control as defined in claim 10, wherein, in said control telegraphic statement, said transaction classification field and said instruction field are placed in common in the same field.

12. An integrated circuit for protocol control as defined in claim 7, wherein said control program includes said device control program, said protocol control program and said application program as modules, and further includes a path control program for offering an interface function for an interconnection between these modules, while a peculiar module identifier is given to each of said modules so that said path control program makes the interconnections between said modules by using said module identifier of the connection-requesting module and said module identifier of the connection-accepting module as parameters.

13. An integrated circuit for protocol control as defined in claim 7, wherein said peripheral control circuit includes a communication control circuit for controlling a communication with an external unit, and said control program includes said device control program, said protocol control program and said application program as modules, and further includes a path control program for offering an interface function for an interconnection between said modules and a communication control program for controlling said communication control circuit, while, when the connection-requesting module pertains to said external unit, said path control program establishes a connection between the connection-requesting module in said integrated circuit and the connection-accepting module in said external unit through said communication control circuit controlled by said communication control program.

14. An integrated circuit for protocol control as defined in claim 13, wherein a peculiar module identifier is given to each of said modules pertaining to said integrated circuit and to each of modules pertaining to said external unit, and a peculiar path identifier is given to said integrated circuit and to said external unit, while said path control program makes an interconnection between said modules by using said module identifier of the connection-requesting module, said module identifier of the connection-accepting module and said path identifiers as parameters.

15. An integrated circuit for protocol control as defined in claim 14, further comprising a table for retaining a correspondence between said module identifier and said path identifier indicative of one of said integrated circuit and said external unit to which said module having the same module identifier given pertains, wherein said path control program retrieves said table on the basis of said module identifier of the connection-accepting module to obtain said path identifier corresponding to said module identifier of the connection-accepting module, and, when the obtained path identifier coincides with said path identifier of said integrated circuit, makes a connection between the connection-requesting module and the connection-accepting module in said integrated circuit, while, when the obtained path identifier does not coincide with the path identifier of said integrated circuit, judges that the connection-accepting module pertains to said external unit and makes a connection between the connection-requesting module in said integrated circuit and the connection-accepting module in said external unit through said communication control circuit.

16. An integrated circuit for protocol control as defined in claim 15, wherein said correspondence retained in said table is made to accept its setting and change through a telegraphic statement received by said communication control circuit.

17. An integrated circuit for protocol control as defined in claim 16, wherein said external unit is a processing unit having the same function as that of said integrated circuit.

18. An integrated circuit for protocol control as defined in claim 16, wherein said external unit is another integrated circuit having the same configuration as that of said integrated circuit.

19. An integrated circuit for protocol control as defined in claim 16, wherein said external unit is a processing unit having an application program for issuing a connection request to said path control program in said integrated circuit for a connection with said module pertaining to said integrated circuit, while, when receiving said connection request from said processing unit through said communication control circuit controlled by said communication control program, said path control program makes a connection between the corresponding module in said integrated circuit and said processing unit.

20. An integrated circuit for protocol control as defined in claim 15, wherein said table is stored in said external storage section serving as said external circuit connected through said interface circuit.

21. An integrated circuit for protocol control as defined in claim 20, wherein said external unit is a processing unit having the same function as that of said integrated circuit.

22. An integrated circuit for protocol control as defined in claim 20, wherein said external unit is another integrated circuit having the same configuration as that of said integrated circuit.

23. An integrated circuit for protocol control as defined in claim 20, wherein said external unit is a processing unit having an application program for issuing a connection request to said path control program in said integrated circuit for a connection with said module pertaining to said integrated circuit, while, when receiving said connection request from said processing unit through said communication control circuit controlled by said communication control program, said path control program makes a connection between the corresponding module in said integrated circuit and said processing unit.

24. An integrated circuit for protocol control as defined in claim 15, wherein said external unit is a processing unit having the same function as that of said integrated circuit.

25. An integrated circuit for protocol control as defined in claim 15, wherein said external unit is another integrated circuit having the same configuration as that of said integrated circuit.

26. An integrated circuit for protocol control as defined in claim 15, wherein said external unit is a processing unit having an application program for issuing a connection request to said path control program in said integrated circuit for a connection with said module pertaining to said integrated circuit, while, when receiving said connection request from said processing unit through said communication control circuit controlled by said communication control program, said path control program makes a connection between the corresponding module in said integrated circuit and said processing unit.

27. An integrated circuit for protocol control as defined in claim 14, wherein said external unit is a processing unit having the same function as that of said integrated circuit.

28. An integrated circuit for protocol control as defined in claim 14, wherein said external unit is another integrated circuit having the same configuration as that of said integrated circuit.

29. An integrated circuit for protocol control as defined in claim 14, wherein said external unit is a processing unit having an application program for issuing a connection request to said path control program in said integrated circuit for a connection with said module pertaining to said integrated circuit, while, when receiving said connection request from said processing unit through said communication control circuit controlled by said communication control program, said path control program makes a connection between the corresponding module in said integrated circuit and said processing unit.

30. An integrated circuit for protocol control as defined in claim 13, wherein said external unit is a processing unit having the same function as that of said integrated circuit.

31. An integrated circuit for protocol control as defined in claim 13, wherein said external unit is another integrated circuit having the same configuration as that of said integrated circuit.

32. An integrated circuit for protocol control as defined in claim 13, wherein said external unit is a processing unit having an application program for issuing a connection request to said path control program in said integrated circuit for a connection with said module pertaining to said integrated circuit, while, when receiving said connection request from said processing unit through said communication control circuit controlled by said communication control program, said path control program makes a connection between the corresponding module in said integrated circuit and said processing unit.

33. An integrated circuit for protocol control as defined in claim 1, wherein a logical cutoff is made between said storage section and an external connecting terminal of said integrated circuit, and said control program is stored in said storage section at the time of production of said integrated circuit.

34. An integrated circuit for protocol control as defined in claim 1, further containing identification means for judging whether or not a program storing external storage section is connected through said interface circuit as said external circuit, wherein, when said identification means judges that said program storing external storage section is in connection, said processing section executes a program stored in said program storing external storage section.

35. An integrated circuit for protocol control as defined in claim 34, wherein said identification means reads one or more logical addresses allocated to connection with said program storing external storage section, and makes a judgment to connection or non-connection with said program storing external storage section by comparing a predetermined value with a value obtained as a reading result.

36. An integrated circuit for protocol control to be incorporated into an apparatus which conducts data interchange through communication with a portable type medium, said integrated circuit being configured by integrating, on one chip, a storage section for storing a plurality of control programs, one prepared for each of a plurality of protocols for a plurality of data communications different in mode, a processing section for controlling said plurality of data communications, different in mode, in the apparatus by executing one control program corresponding to a mode of data communication performed in the apparatus into which said integrated circuit is to be incorporated, wherein said one control program is assigned from the plurality of control programs stored in the storage section, and an interface circuit connected to an external circuit including at least one of an external processing section and an external storage section to fulfill an interface function between said external circuit and said processing section.

\* \* \* \* \*